(12) United States Patent
Sloan et al.

(10) Patent No.: US 12,381,274 B2
(45) Date of Patent: Aug. 5, 2025

(54) ELECTRIC FRONT END ACCESSORY DEVICES ASSEMBLY

(71) Applicant: Hexagon Purus North America Holdings Inc., Lincoln, NE (US)

(72) Inventors: Todd F. Sloan, Kelowna (CA); Chris Forsberg, Kelowna (CA); Eric M. Coupal-Sikes, Kelowna (CA); Landon Tyerman, Kelowna (CA); Benjamin Parker, Kelowna (CA)

(73) Assignee: Hexagon Purus North America Holdings Inc., Lincoln, NE (US)

( * ) Notice: Subject to any disclaimer, the term of this patent is extended or adjusted under 35 U.S.C. 154(b) by 0 days.

(21) Appl. No.: 18/418,684

(22) Filed: Jan. 22, 2024

(65) Prior Publication Data

US 2024/0186614 A1    Jun. 6, 2024

Related U.S. Application Data

(63) Continuation of application No. 18/296,862, filed on Apr. 6, 2023, now abandoned, which is a continuation
(Continued)

(51) Int. Cl.
*B60K 1/04* (2019.01)
*B60L 50/64* (2019.01)
(Continued)

(52) U.S. Cl.
CPC .......... *H01M 10/6556* (2015.04); *B60K 1/04* (2013.01); *B60L 50/64* (2019.02); *H01M 10/613* (2015.04);
(Continued)

(58) Field of Classification Search
CPC ............... B60K 2001/0438; B60K 2001/0416
(Continued)

(56) References Cited

U.S. PATENT DOCUMENTS

| 1,551,594 A | 9/1925 | Maurice |
|---|---|---|
| 1,678,033 A | 7/1928 | Brumbaugh |

(Continued)

FOREIGN PATENT DOCUMENTS

| AU | 2018232986 | 4/2019 |
|---|---|---|
| CN | 2647706 | 10/2004 |

(Continued)

OTHER PUBLICATIONS

Kenworth, "K270E, Zero Emissions", 2020, in 2 pages.
(Continued)

*Primary Examiner* — Jeffrey J Restifo
(74) *Attorney, Agent, or Firm* — Knobbe, Martens, Olson & Bear, LLP

(57) ABSTRACT

An accessory component assembly is provided that includes a frame, a first vehicle accessory, and a second vehicle accessory. The frame is configured to support vehicle accessories. The first vehicle accessory is mounted to the frame. The second vehicle accessory is mounted to the frame. The frame is configured to simultaneously couple the first vehicle accessory and the second vehicle accessory to a chassis of a vehicle such that the accessory component assembly can be functionally coupled to at least two other vehicle sub-systems.

24 Claims, 21 Drawing Sheets

Related U.S. Application Data of application No. 17/338,391, filed on Jun. 3, 2021, now Pat. No. 11,652,250, which is a continuation of application No. 16/852,187, filed on Apr. 17, 2020, now Pat. No. 11,043,707.

(60) Provisional application No. 62/836,389, filed on Apr. 19, 2019.

(51) Int. Cl.
*H01M 10/613* (2014.01)
*H01M 10/625* (2014.01)
*H01M 10/6556* (2014.01)
*H01M 50/249* (2021.01)

(52) U.S. Cl.
CPC ....... *H01M 10/625* (2015.04); *H01M 50/249* (2021.01); *B60K 2001/0405* (2013.01); *H01M 2220/20* (2013.01)

(58) Field of Classification Search
USPC .......................................................... 180/346
See application file for complete search history.

(56) References Cited

U.S. PATENT DOCUMENTS

| | | |
|---|---|---|
| 3,760,134 A | 9/1973 | McCray |
| 3,883,794 A | 3/1975 | Sivley |
| 4,248,323 A | 2/1981 | Gaffney |
| 4,317,497 A | 3/1982 | Alt et al. |
| 4,365,681 A | 12/1982 | Singh |
| 4,435,990 A | 3/1984 | Chalmers |
| 5,421,600 A | 6/1995 | Jones et al. |
| 5,460,234 A | 10/1995 | Matsuura et al. |
| 5,558,949 A | 9/1996 | Iwatsuki et al. |
| 5,585,205 A | 12/1996 | Kohchi |
| 5,854,517 A | 12/1998 | Hines |
| 6,148,928 A | 11/2000 | Spears |
| 6,188,574 B1 | 2/2001 | Anazawa |
| 6,443,253 B1 | 9/2002 | Whitehead et al. |
| 6,547,020 B2 | 4/2003 | Maus et al. |
| 6,575,258 B1 | 6/2003 | Clemmer |
| 6,624,610 B1 | 9/2003 | Ono et al. |
| 6,668,957 B2 | 12/2003 | King |
| 6,926,027 B1 | 8/2005 | Sorensen |
| 6,971,657 B2 | 12/2005 | King et al. |
| 7,051,825 B2 | 5/2006 | Masui et al. |
| 7,144,039 B2 | 12/2006 | Kawasaki et al. |
| 7,174,967 B2 | 2/2007 | Raimondo et al. |
| 7,237,644 B2 | 7/2007 | Matsumoto et al. |
| 7,398,849 B2 | 7/2008 | Yoshida |
| 7,507,499 B2 | 3/2009 | Zhou et al. |
| 7,543,454 B2 | 6/2009 | Harris |
| 7,686,720 B2 | 3/2010 | Nikolai |
| 7,854,443 B2 | 12/2010 | Alguera |
| 7,931,105 B2 | 4/2011 | Sato et al. |
| 8,037,960 B2 | 10/2011 | Kiya |
| 8,051,934 B2 | 11/2011 | Kiya et al. |
| 8,122,989 B2 | 2/2012 | Burchett |
| 8,127,876 B2 | 3/2012 | Phillips |
| 8,276,697 B2 | 10/2012 | Takasaki |
| 8,342,279 B1 | 1/2013 | Florus et al. |
| 8,397,853 B2 | 3/2013 | Stefani et al. |
| 8,464,817 B2 | 6/2013 | Usami et al. |
| 8,474,559 B2 | 7/2013 | Sogabe |
| 8,505,950 B2 | 8/2013 | Kolda |
| 8,517,126 B2 | 8/2013 | Atarashi |
| 8,596,685 B2 | 12/2013 | Mauduit et al. |
| 8,616,319 B2 | 12/2013 | Yokoyama et al. |
| 8,672,354 B2 | 3/2014 | Kim et al. |
| 8,701,842 B2 | 4/2014 | Anderson |
| 8,764,469 B2 | 7/2014 | Lamb |
| 8,776,927 B2 | 7/2014 | Akazawa et al. |
| 8,778,527 B2 | 7/2014 | Lee |
| 8,783,396 B2 | 7/2014 | Bowman |
| 8,789,635 B2 * | 7/2014 | Franzen ................. B60L 15/38 180/68.5 |
| 8,794,361 B2 | 8/2014 | Lim et al. |
| 8,839,901 B1 * | 9/2014 | Bradshaw .......... B62D 25/2072 180/346 |
| 8,905,170 B2 | 12/2014 | Kyoden et al. |
| 9,033,078 B2 | 5/2015 | Fillion et al. |
| 9,033,085 B1 | 5/2015 | Rawlinson |
| 9,056,557 B2 | 6/2015 | Kedzierski |
| 9,061,712 B2 * | 6/2015 | Patberg ................ B62D 21/157 |
| 9,077,019 B2 | 7/2015 | Kosaki et al. |
| 9,085,226 B2 | 7/2015 | Matsuda et al. |
| 9,103,092 B2 | 8/2015 | Ueda |
| 9,108,497 B2 * | 8/2015 | Harrison, III ............ B60K 1/04 |
| 9,108,691 B2 * | 8/2015 | Fanourakis ............ B62D 53/06 |
| 9,205,749 B2 | 12/2015 | Sakamoto |
| 9,227,582 B2 | 1/2016 | Katayama et al. |
| 9,283,838 B2 | 3/2016 | Ohashi |
| 9,315,173 B1 | 4/2016 | Gray et al. |
| 9,321,352 B2 | 4/2016 | Pierce et al. |
| 9,409,495 B2 | 8/2016 | Kobayashi |
| 9,457,652 B2 | 10/2016 | Sloan et al. |
| 9,586,490 B2 | 3/2017 | Yamamaru et al. |
| 9,636,984 B1 | 5/2017 | Baccouche et al. |
| 9,776,665 B2 | 10/2017 | Garay et al. |
| 9,812,685 B2 | 11/2017 | Nozaki et al. |
| 9,879,802 B2 | 1/2018 | Getts |
| 9,884,545 B1 | 2/2018 | Addanki et al. |
| 9,887,570 B2 | 2/2018 | Johnsen et al. |
| 9,902,348 B2 | 2/2018 | Takeda |
| 10,000,908 B2 | 6/2018 | Ota et al. |
| 10,017,037 B2 | 7/2018 | Newman et al. |
| 10,121,609 B2 | 11/2018 | Coursol |
| 10,160,344 B2 | 12/2018 | Newman |
| 10,166,883 B2 | 1/2019 | Brendecke et al. |
| 10,177,356 B1 | 1/2019 | Yang et al. |
| 10,183,698 B2 | 1/2019 | Ta et al. |
| 10,193,112 B2 | 1/2019 | Zimbru, Jr. et al. |
| 10,199,781 B2 | 2/2019 | Deatherage |
| 10,201,913 B2 | 2/2019 | McNeilus et al. |
| 10,236,496 B2 | 3/2019 | Nakayama et al. |
| 10,245,972 B2 | 4/2019 | Healy et al. |
| 10,259,329 B2 | 4/2019 | Hosaka et al. |
| 10,308,132 B2 | 6/2019 | Milton et al. |
| 10,358,023 B2 * | 7/2019 | Hegewald ................ B60K 1/04 |
| 10,358,024 B2 | 7/2019 | Yugami et al. |
| 10,414,351 B2 | 9/2019 | Katano |
| 10,421,345 B2 | 9/2019 | Kerspe et al. |
| 10,427,627 B2 | 10/2019 | Fukazu et al. |
| 10,457,156 B2 | 10/2019 | Takizawa et al. |
| 10,464,613 B2 | 11/2019 | Okura |
| 10,486,515 B2 | 11/2019 | Saeki |
| 10,493,837 B1 * | 12/2019 | Angelo ................... B60L 50/66 |
| 10,516,146 B2 | 12/2019 | Fees et al. |
| 10,543,796 B2 | 1/2020 | Isafushi et al. |
| 10,559,858 B2 | 2/2020 | Goitsuka et al. |
| 10,569,634 B2 | 2/2020 | Dawley |
| 10,583,746 B2 | 3/2020 | Ogaki et al. |
| 10,589,788 B1 | 3/2020 | Milton et al. |
| 10,589,797 B2 | 3/2020 | Milton et al. |
| 10,604,188 B2 | 3/2020 | Yoshii |
| 10,611,408 B2 | 4/2020 | Fritz et al. |
| 10,641,431 B2 | 5/2020 | Mallick et al. |
| 10,654,530 B2 | 5/2020 | Milton et al. |
| 10,661,680 B2 | 5/2020 | Milton et al. |
| 10,661,844 B2 | 5/2020 | Milton et al. |
| 10,668,807 B2 | 6/2020 | Milton et al. |
| 10,670,191 B2 | 6/2020 | Yeggy |
| 10,688,856 B2 | 6/2020 | Kasai et al. |
| 10,688,857 B2 | 6/2020 | Tsuyuzaki et al. |
| 10,696,251 B2 | 6/2020 | Muramatsu et al. |
| 10,703,416 B2 | 7/2020 | Okura et al. |
| 10,752,102 B2 | 8/2020 | Lampsa et al. |
| 10,823,333 B2 | 11/2020 | Criel et al. |
| 10,843,677 B1 | 11/2020 | Paradis |
| 10,899,214 B2 * | 1/2021 | Sloan ...................... B60L 50/64 |
| 11,040,610 B2 | 6/2021 | Sloan et al. |
| 11,043,707 B2 * | 6/2021 | Sloan ...................... B60K 11/02 |

(56) References Cited

U.S. PATENT DOCUMENTS

| | | | |
|---|---|---|---|
| 11,043,714 B2* | 6/2021 | Sloan | B60L 53/80 |
| 11,046,192 B2* | 6/2021 | Aufdencamp | B60L 50/60 |
| 11,110,786 B2 | 9/2021 | Loacker | |
| 11,124,076 B1* | 9/2021 | Borghi | B60K 1/04 |
| 11,155,148 B2 | 10/2021 | Chung et al. | |
| 11,312,221 B2 | 4/2022 | Sloan et al. | |
| 11,345,331 B2 | 5/2022 | McKibben et al. | |
| 11,465,482 B2 | 10/2022 | Menon et al. | |
| 11,498,435 B2 | 11/2022 | Herbert et al. | |
| 11,652,250 B2 | 5/2023 | Sloan et al. | |
| 11,685,268 B2* | 6/2023 | Sjöholm | B62D 27/02 |
| | | | 180/68.5 |
| 11,712,937 B1 | 8/2023 | Daugherty | |
| 11,718,194 B2 | 8/2023 | Miler | |
| 11,772,474 B2 | 10/2023 | Sloan et al. | |
| 11,776,335 B1 | 10/2023 | Schubert et al. | |
| 11,780,337 B2 | 10/2023 | Sloan et al. | |
| 11,904,676 B2* | 2/2024 | Blomstrand | B60K 1/04 |
| 11,919,343 B2 | 3/2024 | McKibben et al. | |
| 11,926,207 B2* | 3/2024 | McKibben | B60L 58/21 |
| 11,938,804 B2* | 3/2024 | Andersson | B60K 1/04 |
| 12,054,040 B2 | 8/2024 | Koti | |
| 12,070,996 B2* | 8/2024 | Kvaldén | B62D 21/09 |
| 12,157,362 B2 | 12/2024 | Sloan et al. | |
| 2004/0134699 A1 | 7/2004 | Shimizu | |
| 2004/0178602 A1 | 9/2004 | King et al. | |
| 2004/0231831 A1 | 11/2004 | Houck et al. | |
| 2005/0162015 A1 | 7/2005 | Yamaguchi et al. | |
| 2005/0218136 A1 | 10/2005 | Kotani et al. | |
| 2006/0102398 A1 | 5/2006 | Mizuno | |
| 2007/0092764 A1 | 4/2007 | Kobayashi | |
| 2008/0169139 A1 | 7/2008 | Kramer | |
| 2008/0169144 A1 | 7/2008 | DeGrave et al. | |
| 2008/0225483 A1 | 9/2008 | Kahn et al. | |
| 2008/0258682 A1 | 10/2008 | Li | |
| 2009/0014224 A1* | 1/2009 | Rydberg | B60R 16/04 |
| | | | 180/68.5 |
| 2009/0136844 A1 | 5/2009 | Watanabe et al. | |
| 2009/0201650 A1 | 8/2009 | Hauser et al. | |
| 2010/0000816 A1 | 1/2010 | Okada | |
| 2010/0062329 A1 | 3/2010 | Muis | |
| 2010/0065344 A1 | 3/2010 | Collings, III | |
| 2010/0112843 A1 | 5/2010 | Heichal et al. | |
| 2010/0163326 A1 | 7/2010 | Takamura et al. | |
| 2010/0175940 A1 | 7/2010 | Taneda et al. | |
| 2010/0320012 A1 | 12/2010 | van der Stappen et al. | |
| 2010/0320040 A1 | 12/2010 | Anderson | |
| 2011/0068622 A1 | 3/2011 | Ikeno et al. | |
| 2011/0114398 A1 | 5/2011 | Bianco | |
| 2011/0260530 A1 | 10/2011 | Steffka et al. | |
| 2011/0287287 A1 | 11/2011 | Kang | |
| 2012/0055725 A1 | 3/2012 | Mizoguchi et al. | |
| 2012/0090907 A1 | 4/2012 | Storc et al. | |
| 2012/0103714 A1 | 5/2012 | Choi et al. | |
| 2012/0160583 A1 | 6/2012 | Rawlinson | |
| 2012/0175177 A1 | 7/2012 | Lee et al. | |
| 2012/0255799 A1 | 10/2012 | Kohler et al. | |
| 2012/0312612 A1 | 12/2012 | Harrision, III et al. | |
| 2013/0001384 A1 | 1/2013 | Karlsson et al. | |
| 2013/0065099 A1 | 3/2013 | Mishima | |
| 2013/0108404 A1 | 5/2013 | Okumura et al. | |
| 2013/0108897 A1 | 5/2013 | Christian et al. | |
| 2013/0248268 A1 | 9/2013 | Matsuda et al. | |
| 2014/0141288 A1 | 5/2014 | Kim et al. | |
| 2014/0287284 A1 | 9/2014 | Shibata | |
| 2014/0338999 A1 | 11/2014 | Fujii et al. | |
| 2014/0367183 A1 | 12/2014 | Matsuda | |
| 2015/0194712 A1 | 7/2015 | He et al. | |
| 2015/0291056 A1 | 10/2015 | Nozaki | |
| 2016/0079795 A1 | 3/2016 | Patterson et al. | |
| 2016/0087256 A1 | 3/2016 | Wagner et al. | |
| 2016/0190526 A1 | 6/2016 | Yamada et al. | |
| 2016/0226041 A1 | 8/2016 | Jackson et al. | |
| 2016/0297283 A1 | 10/2016 | Sakamoto et al. | |
| 2017/0012506 A1 | 1/2017 | Naito et al. | |
| 2017/0225558 A1 | 8/2017 | Newman et al. | |
| 2017/0282709 A1 | 10/2017 | Sasaki et al. | |
| 2017/0320382 A1 | 11/2017 | Milton et al. | |
| 2018/0022389 A1 | 1/2018 | Kageyama et al. | |
| 2018/0062125 A1 | 3/2018 | Kaneshige | |
| 2018/0145382 A1 | 5/2018 | Harris et al. | |
| 2018/0183118 A1 | 6/2018 | Harris et al. | |
| 2018/0190960 A1 | 7/2018 | Harris et al. | |
| 2018/0201110 A1 | 7/2018 | Yin et al. | |
| 2018/0319263 A1 | 11/2018 | Hegewald et al. | |
| 2018/0333905 A1 | 11/2018 | Tong et al. | |
| 2018/0339594 A1* | 11/2018 | Brown | B60L 50/40 |
| 2018/0370368 A1 | 12/2018 | Kronsteiner et al. | |
| 2019/0036181 A1 | 1/2019 | Tokozakura et al. | |
| 2019/0061505 A1 | 2/2019 | Cavus et al. | |
| 2019/0074495 A1 | 3/2019 | Haeusler et al. | |
| 2019/0074497 A1 | 3/2019 | Haeusler et al. | |
| 2019/0081298 A1 | 3/2019 | Matecki et al. | |
| 2019/0084397 A1 | 3/2019 | Yugami et al. | |
| 2019/0181517 A1 | 3/2019 | Kellner et al. | |
| 2019/0202312 A1 | 7/2019 | Aufdencamp | |
| 2019/0202429 A1 | 7/2019 | Richter et al. | |
| 2019/0229314 A1 | 7/2019 | Ribbentrop et al. | |
| 2019/0263449 A1 | 8/2019 | Ta et al. | |
| 2019/0291560 A1 | 9/2019 | Lampsa et al. | |
| 2019/0296541 A1 | 9/2019 | Mensch et al. | |
| 2019/0302764 A1 | 10/2019 | Smith et al. | |
| 2019/0326573 A1 | 10/2019 | Ozawa et al. | |
| 2019/0393571 A1 | 12/2019 | Weicker et al. | |
| 2020/0002828 A1 | 1/2020 | Mills et al. | |
| 2020/0083573 A1 | 3/2020 | Caliskan et al. | |
| 2020/0088299 A1 | 3/2020 | Baumer et al. | |
| 2020/0094669 A1 | 3/2020 | DeLizo et al. | |
| 2020/0139808 A1 | 5/2020 | Rike | |
| 2020/0152938 A1 | 5/2020 | Winger et al. | |
| 2020/0156500 A1 | 5/2020 | Huff et al. | |
| 2020/0157769 A1 | 5/2020 | Huff et al. | |
| 2020/0180848 A1 | 6/2020 | Snyder et al. | |
| 2020/0247225 A1 | 8/2020 | Kochi et al. | |
| 2020/0269642 A1 | 8/2020 | Alguera | |
| 2020/0335840 A1 | 10/2020 | Sloan et al. | |
| 2020/0369228 A1 | 11/2020 | Kageyama et al. | |
| 2020/0384854 A1 | 12/2020 | Sloan et al. | |
| 2020/0406777 A1 | 12/2020 | Nguyen et al. | |
| 2021/0036649 A1 | 2/2021 | Iwazaki | |
| 2021/0094400 A1 | 4/2021 | Loacker et al. | |
| 2021/0129688 A1 | 5/2021 | Sawada | |
| 2021/0155224 A1 | 5/2021 | McKibben et al. | |
| 2021/0213821 A1 | 7/2021 | Sloan et al. | |
| 2021/0218101 A1 | 7/2021 | Menon et al. | |
| 2021/0380001 A1* | 12/2021 | Hörder | B60L 50/64 |
| 2022/0021050 A1 | 1/2022 | Sloan et al. | |
| 2022/0021056 A1 | 1/2022 | Sloan et al. | |
| 2022/0029176 A1 | 1/2022 | Rovik | |
| 2022/0111716 A1 | 4/2022 | McKibben et al. | |
| 2022/0242215 A1 | 8/2022 | Sloan et al. | |
| 2022/0274494 A1 | 9/2022 | McKibben et al. | |
| 2022/0348113 A1* | 11/2022 | Delrieu | H01M 50/249 |
| 2022/0388392 A1 | 12/2022 | Abbott | |
| 2023/0001986 A1* | 1/2023 | Hendriks | B62D 21/11 |
| 2023/0066866 A1 | 3/2023 | Smith | |
| 2023/0126938 A1 | 4/2023 | Takaguchi et al. | |
| 2023/0158880 A1* | 5/2023 | Ragot | B62D 21/155 |
| | | | 180/68.5 |
| 2023/0311597 A1 | 10/2023 | McKibben et al. | |
| 2023/0318084 A1 | 10/2023 | Sloan et al. | |
| 2023/0406086 A1 | 12/2023 | Sloan et al. | |
| 2023/0415556 A1* | 12/2023 | Wolf | B60K 1/04 |
| 2023/0415587 A1 | 12/2023 | Sloan et al. | |
| 2024/0140154 A1 | 5/2024 | McKibben et al. | |
| 2024/0149657 A1 | 5/2024 | Coupal-Sikes et al. | |
| 2024/0166040 A1* | 5/2024 | Coupal-Sikes | H01M 50/207 |
| 2024/0166060 A1* | 5/2024 | Tyerman | H01M 50/242 |
| 2024/0166069 A1 | 5/2024 | McKibben et al. | |
| 2024/0253700 A1* | 8/2024 | Zarpelon | B62D 21/03 |
| 2024/0286480 A1* | 8/2024 | Kumagai | B60L 50/66 |
| 2024/0300324 A1* | 9/2024 | Oko | B60K 15/07 |
| 2024/0416764 A1 | 12/2024 | Sloan et al. | |

(56) References Cited

U.S. PATENT DOCUMENTS

FOREIGN PATENT DOCUMENTS

| | | |
|---|---|---|
| CN | 103863080 | 6/2014 |
| CN | 104993151 | 10/2015 |
| CN | 105438262 | 3/2016 |
| CN | 107848386 | 3/2018 |
| CN | 110914585 | 3/2020 |
| CN | 217270085 | 8/2022 |
| DE | 101 08 713 A1 | 9/2002 |
| DE | 10 2006 009 189 | 7/2007 |
| DE | 10 2011 109 024 | 1/2013 |
| DE | 10 2012 109062 | 3/2014 |
| DE | 10 2013 000112 | 3/2014 |
| DE | 10 2017 005313 | 12/2018 |
| EP | 1 577 143 | 9/2005 |
| EP | 2 008 917 | 12/2008 |
| EP | 2 554 420 | 5/2014 |
| EP | 2 712 748 | 5/2017 |
| EP | 2 712 788 | 2/2020 |
| EP | 3 640 123 | 4/2020 |
| ES | 1079022 | 4/2013 |
| GB | 491788 | 9/1938 |
| GB | 527052 | 10/1940 |
| GB | 744973 | 2/1956 |
| GB | 2546535 | 7/2017 |
| GB | 2555906 | 5/2018 |
| JP | 2004-142524 | 5/2004 |
| JP | 2008-265685 | 11/2008 |
| JP | 2010-100207 | 5/2010 |
| JP | 2014-069686 | 4/2014 |
| KR | 10-1998-0035495 | 8/1998 |
| KR | 10-2017-0000950 | 1/2017 |
| KR | 10-2549321 | 6/2023 |
| WO | WO 2014/044618 | 3/2014 |
| WO | WO 2016/210329 | 12/2016 |
| WO | WO 2018/123337 | 7/2018 |
| WO | WO 2020/041630 | 2/2020 |
| WO | WO 2020/215018 | 10/2020 |
| WO | WO 2020/215023 | 10/2020 |
| WO | WO 2021/108429 | 6/2021 |
| WO | WO 2022/092994 | 5/2022 |
| WO | WO 2022/125929 | 6/2022 |
| WO | WO 2023/027959 | 3/2023 |
| WO | WO 2023/027960 | 3/2023 |
| WO | WO 2023/027961 | 3/2023 |
| WO | WO 2023/027965 | 3/2023 |
| WO | WO 2024/025711 | 2/2024 |

OTHER PUBLICATIONS

International Search Report and Written Opinion issued in PCT Application No. PCT/US2019/047773, dated Nov. 18, 2019, in 16 pages.
International Search Report and Written Opinion issued in International Patent Application No. PCT/US2020/028859, mailed Sep. 4, 2020 in 15 pages.
International Search Report and Written Opinion issued in International Patent Application No. PCT/US2020/028866, mailed Aug. 14, 2020 in 18 pages.
Invitation to Pay Additional Search Fees in International Patent Application No. PCT/US2020/028859, dated Jul. 1, 2020 in 2 pages.
Invitation to Pay Additional Search Fees in International Patent Application No. PCT/US2020/028866, dated Jun. 4, 2020 in 2 pages.
Tuma, "How to store lithium ion battery cell pack in electric bus?", dated Jul. 3, 2019, in 7 pages.
Tuma, Sliding Rails for Ebus Lithium Battery Pack Tray Automatic Bus Door Opening Mechanism, dated Aug. 15, 2019, in 3 pages.

* cited by examiner

ELECTRIC FRONT END ACCESSORY DEVICES ASSEMBLY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field

This application is directed to front end accessory component assemblies and high voltage cable and coolant assemblies and protection for the same that can be integrated into electric vehicle systems to streamline assembly of such systems and assemblies to a vehicle.

Related Art

Electric vehicles have become more and more popular in recent years. This is particularly true among passenger vehicles. The use of electric motors and batteries to propel heavy duty vehicles has been much less prevalent.

SUMMARY

There is a need for improved systems and strategies for equipping vehicles with electric storage, auxiliary, and propulsion assemblies. Such should enable more than one vehicle component to be mounted in a front end compartment of the vehicle assembly at the same time. A shared frame to support multiple components is needed. A frame that can fit within the front end compartment of a stock chassis and be conveniently mounted thereto in a straightforward manner to control and distribute current from one or more battery assemblies is needed. A frame that can fit within the front end compartment of more than one stock chassis or even to any marketed vehicle chassis and be conveniently mounted thereto with a small number of connection steps would be beneficial.

In one embodiment, a front end accessory component assembly is provided that includes a frame, a first vehicle accessory, and a second vehicle accessory. The frame is configured to support vehicle accessories. The first vehicle accessory is mounted to the frame. The second vehicle accessory is mounted to the frame. The frame is configured to couple the first vehicle accessory and the second vehicle accessory to a chassis of a vehicle such that the front end accessory component assembly can be functionally coupled to at least two other vehicle sub-systems.

The front end accessory component assembly greatly simplifies assembly to a vehicle assembly. The front end accessory assembly can be pre-assembled as a unit away from the vehicle chassis. This allows for easier connections of components within the front end assembly because there is greater access to all sides of the frame of the front end accessory component assembly outside of the vehicle. The front end accessory component assembly enables connection of the accessories mounted on the frame of the front end accessory component assembly to the vehicle assembly by moving the pre-assembled unit into position in a front end compartment of a vehicle that would traditionally be occupied by the engine. After the front end accessory assembly is secured to the vehicle within the front end compartment only a few additional connections (e.g., coolant conduits and electrical connections) are needed to integrate the assembly with the full vehicle.

The frame of the front end accessory component assembly can have an electrical component and a thermal management component coupled thereto. The electrical component can be electrically connected to a controller in a pre-installed configuration. The thermal management component is connected to a fluid conduit in the pre-installed configuration. The pre-installed configuration can be a configuration prior to placing the frame in a front end compartment of a vehicle assembly.

The frame of the front end accessory component assembly can have an accessory power distribution unit coupled thereto. The accessory power distribution unit can be electrically coupled with a plurality of electrical components in a pre-installed configuration.

The frame of the front end accessory component assembly can have a heat exchanger coupled thereto. The heat exchanger can be fluidly coupled to a plurality of segments of a coolant loop in a pre-installed configuration.

In another embodiment, a frame is provided for supporting vehicle accessory components. The frame includes a frame array, a first tray, and a second tray. The frame array is configured to provide a rigid three dimensional frame structure. The first tray is coupled with the frame array. The first tray is configured to support an electrical component of a front end accessory component assembly. The second tray is coupled with the frame array spaced apart from the first tray. The second tray is configured to support a thermal management component of a front end accessory component assembly. The frame includes a plurality of frame system mounts. The frame is configured to be connected to a chassis of a vehicle to simultaneously mount a thermal management component coupled with the second tray and an electrical component coupled with the first tray to the chassis of the vehicle.

In another embodiment, an accessory component assembly is provided that includes a frame, a first vehicle accessory, and a second vehicle accessory. The frame is configured to support vehicle accessories. The first vehicle accessory is mounted to the frame. The second vehicle accessory is mounted to the frame. The frame is configured to couple the first vehicle accessory and the second vehicle accessory to a chassis of a vehicle such that the accessory component assembly can be functionally coupled to at least two other vehicle sub-systems.

The accessory component assembly can be a front end accessory component assembly or a rear end electric component assembly. The accessory component can be pre-assembled to allow the components thereof to be installed together onto a front end or rear or back end portion of a vehicle.

An electrical component and a thermal management component can be pre-assembled to a frame of the accessory component assembly, which can be configured to mount to a front end of a vehicle (e.g., in an engine compartment) or rear end portion of a vehicle (e.g., between frame rails rearward of front wheels). The electrical component can be electrically connected to a controller in a pre-installed configuration. The thermal management component is connected to a fluid conduit in the pre-installed configuration. The pre-installed configuration can be a configuration prior to placing the frame in a front end compartment of a vehicle assembly or to a frame assembly toward a rear end of a vehicle assembly.

The frame of the front or rear accessory component assembly can have an accessory power distribution unit coupled thereto. The accessory power distribution unit can be electrically coupled with a plurality of electrical components in a pre-installed configuration.

The frame of the front or rear end accessory component assembly can have a coolant loop component coupled thereto. The coolant loop component can be a conduit fluidly coupled to a component in need of cooling or to a heat exchanger of the accessory component assembly in a pre-installed configuration.

In another embodiment an electric vehicle system is provided that includes a battery assembly, an electrical load, and an electrical assembly. The battery assembly is configured to be coupled to a vehicle at or adjacent to a cab of the vehicle. The electrical load is configured to be disposed rearward of the battery assembly. The electrical assembly is configured to be disposed adjacent to the battery assembly. The electrical assembly includes a circuit configured to receive current from the battery assembly and/or to direct current to the battery assembly. The circuit generates heat in operating on the current. The electrical assembly is configured to receive coolant to remove heat from the heat generating circuit.

In another embodiment a vehicle equipping system is provided. The vehicle equipping system includes an electrical assembly disposed in a first housing. The first housing can contain one or a plurality of shared components, e.g., components that can be dedicated to processing current from or to a battery assembly. The vehicle equipping system further comprises a second housing configured to be mounted to a vehicle adjacent to the first housing. The second housing provides a modular component mounting space. The system also includes a plurality of current processing components each of which has a different form factor. The modular mounting space of the second housing is adapted to selectively receive and have mounted therein a power converter or other load or vehicle specific components. The second housing helps to increase or maximize the use of shared components by itself being usable with different form factors components that can be disposed therein.

BRIEF DESCRIPTION OF THE DRAWINGS

Features of the invention can be better understood from the following detailed description when read in conjunction with the accompanying schematic drawings, which are for illustrative purposes only. The drawings include the following figures.

DETAILED DESCRIPTION

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein. Each and every feature described herein, and each and every combination of two or more of such features, is included within the scope of the present invention provided that the features included in such a combination are not mutually inconsistent.

This application discloses novel electrical power systems, including a battery assembly 100, one or more battery assemblies 100, and/or one or more of the battery assemblies 100 and a front end accessory component assembly 104. This application also is directed to electric vehicle systems that can include one or more rear electric component assemblies in combination with a battery assembly 100 and/or a front end accessory component assembly 104. This application is also directed to structures for protecting cables and junctions between cables and other components of an electric vehicle system within a vehicle assembly. By providing highly integrated systems, a vehicle assembly 50 or a vehicle assembly 50A can be quickly, reliably and durably equipped with an electrical power system that can include battery assemblies and accessory component assemblies configured to be in electrical and/or fluid communication with the battery assemblies.

I. Vehicle Assembly Including Electrical Power System

Figure 1:
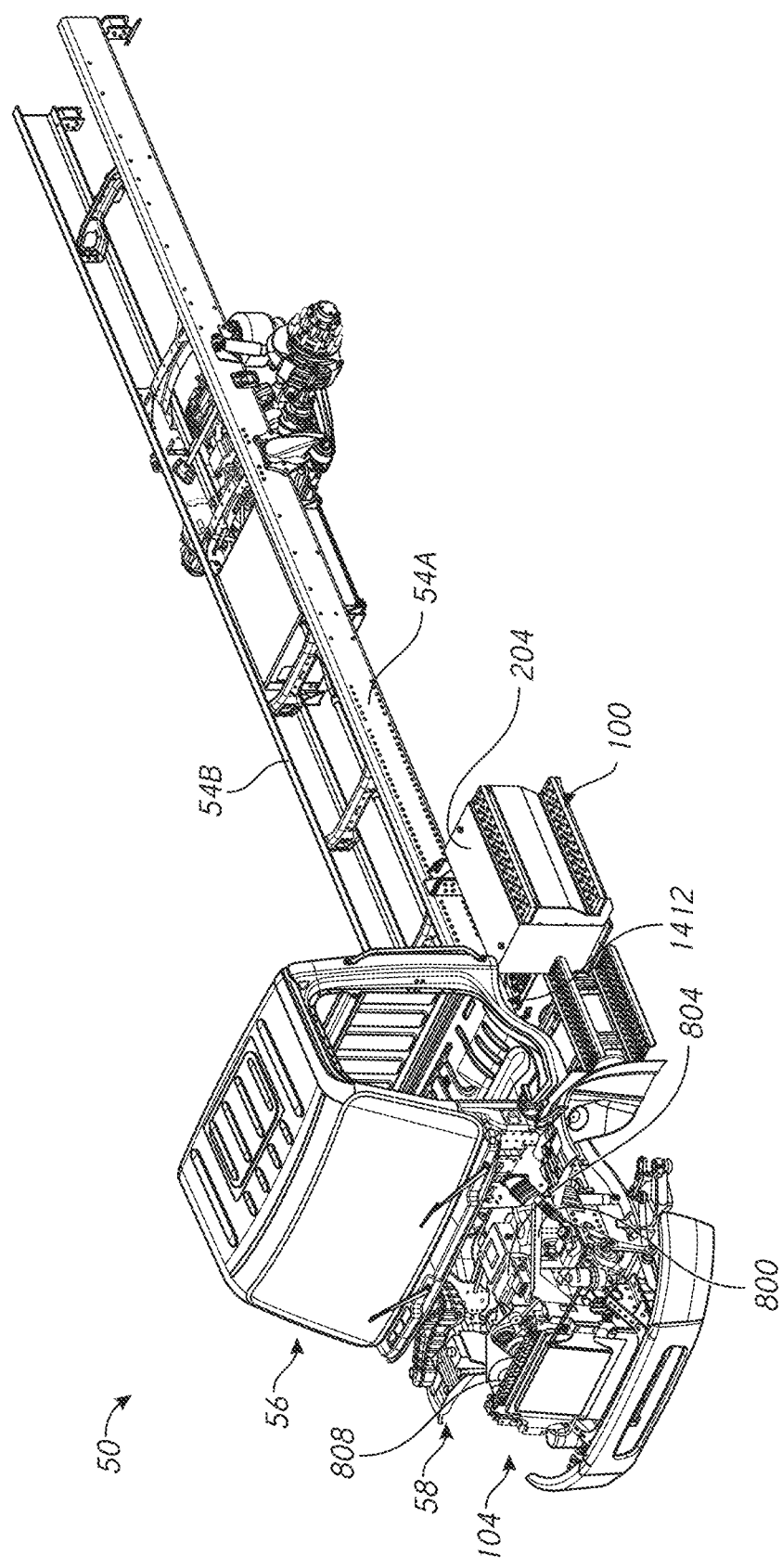
FIG. 1 is an isometric view of a vehicle assembly.
Figure 2:
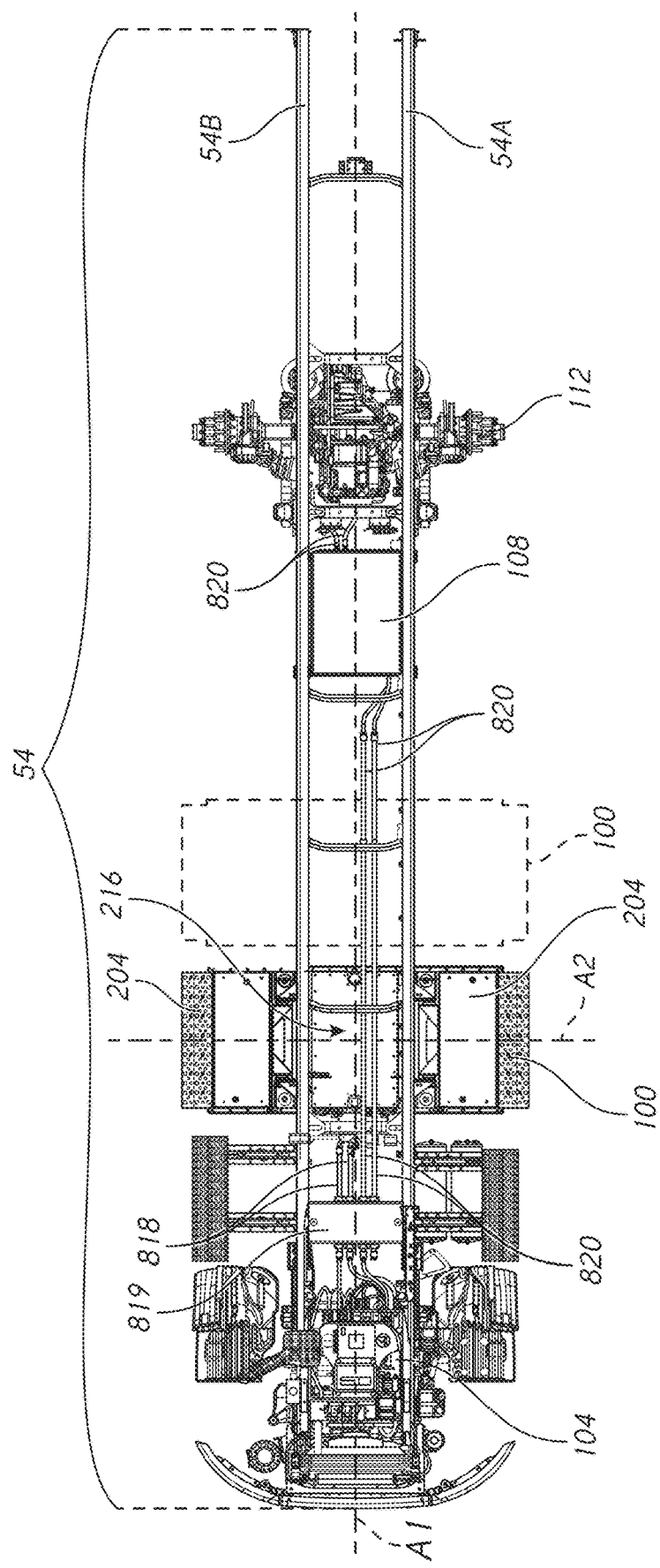
FIG. 2 is a top view of the vehicle assembly shown in FIG. 1 with a cab assembly removed for clarity.

FIGS. 1 and 2 show an example of a vehicle assembly 50 that can be equipped with one or more examples of systems disclosed herein. A fully assembled vehicle would have more components than illustrated in FIG. 1, e.g., wheels, a hood, a cargo box disposed on the frame assembly 54 and other components. But for simplicity of illustration these other components are not shown. The vehicle assembly 50 includes a frame assembly 54 that includes frame members, such as a first longitudinal frame member 54A and a second longitudinal frame member 54B. The frame assembly 54 can be or can form a portion of a chassis. The vehicle assembly 50 can include a cab 56 rigidly coupled to the frame assembly 54. The vehicle assembly 50 can include an articulating connection between the cab 56 and a rear portion the frame assembly 54 in other embodiments. The cab 56 can be disconnectable from the rear portion, e.g., as in a tractor-trailer configuration. Many other vehicle assemblies can form an environment for deploying examples of systems disclosed herein.

FIG. 1 shows a perspective view in which a battery assembly 100 is coupled with the frame assembly 54. The battery assembly 100 can be mounted to the frame assembly 54 across a central longitudinal axis A1 (see FIG. 2) of the frame assembly 54. FIG. 2 shows that in some examples, the battery assembly 100 is elongate along a longitudinal axis A2. The battery assembly 100 can have a first set of sides that are parallel to the longitudinal axis A2 and a second set of sides that are transverse to the longitudinal axis A2. The first set of sides can be long sides of the battery assembly 100. The battery assembly 100 can be configured such that either of the sides parallel to the longitudinal axis A2 can be forward or rearward facing on the vehicle assembly 50 when applied. The battery assembly 100 can be configured such that either of the sides transverse to the longitudinal axis A2 can be on a driver side or a passenger side of the vehicle assembly 50 when applied. The battery assembly 100 can be oriented transverse to the longitudinal axis A1 of the vehicle assembly 50 when coupled thereto. The battery assembly 100 can be generally symmetrical about an axis perpendicular to the longitudinal axis A2 (e.g., an axis central to the battery assembly 100 or equidistant from the end portions thereof). In some cases, only one of the first set of sides has electrical connections. Symmetry to the longitudinal axis A2 provides that at least some of the connection features, e.g., the coolant connections, can be located in the same position regardless of which of the vertical faces across the long direction of the battery assembly 100 is forward facing. The battery assembly 100 can be symmetrical to the longitudinal axis A1 of the vehicle assembly 50 when the battery assembly 100 is mounted to the vehicle assembly 50. The symmetry about the longitudinal axis A1 evenly distributes the weight of the battery assembly 100 on the frame assembly 54. This enables a mounting system for connecting the battery assembly 100 to the vehicle assembly 50 to include the same or similar components on both sides of the longitudinal axis A1.

FIGS. 1 and 2 illustrate at least three manners in which a modular electric vehicle system can be provided. Such a modular system can include the battery assembly 100. FIG. 1 shows that the vehicle assembly 50 can also have coupled therewith a front end accessory component assembly 104. The front end accessory component assembly 104 can be a system that can be mounted in a front end compartment 58 of the vehicle assembly 50. The front end compartment 58 can be of the same or a similar configuration as is provided in a combustion engine vehicle. That is, the front end compartment 58 can be or can include a space or a volume that is enclosed by the chassis of the vehicle assembly 50 and by a hood (now shown for clarity). The volume and general form of front end compartment 58 can be configured for an internal combustion engine. The front end accessory component assembly 104 can be shaped to occupy approximately the same volume or less volume than is occupied by the conventional internal combustion engine for which the vehicle assembly 50 was originally constructed. Said another way, the chassis including the frame assembly 54 and the front end compartment 58 can be originally designed for or can be compatible with an internal combustion engine, but can be diverted in manufacturing to an assembly including the front end accessory component assembly 104. This enables the end customer to elect between internal combustion engines and electric motor propulsion of the vehicle. Some customers may require both propulsion types but may desire the same overall vehicle configuration for other systems and subsystems. Thus, the electric vehicle systems disclosed herein advantageously do not require a custom chassis or front end compartment 58.

The front end accessory component assembly 104 can be configured to mount within the front end compartment 58 with some minimal modifications. For example, the front end accessory component assembly 104 can be coupled with brackets that can mount in convenient locations within the front end compartment 58. Such locations may be predefined by the manufacturer of the vehicle assembly 50 or may be provided by the installer, for example drilling holes in the chassis as needed. In some embodiments, such brackets can be coupled near or even directly on existing engine mounts that are provided for a conventional combustion engine. The mounts that would otherwise support the engine can be used to support one or more support brackets coupled with the front end accessory component assembly 104 in some applications.

A modular system can combine the battery assembly 100 and the front end accessory component assembly 104 which can be placed in communication with each other, as discussed further below. A modular system can combine the battery assembly 100 and a rear end electric component assembly 108 which can be placed in communication with each other, as discussed further below. The rear end electric component assembly 108 can be integrated into a single housing. In some embodiments power distribution components can be housed in a first electrical sub-assembly 108A and a second electrical sub-assembly 108B such that shared components can be housed together and vehicle specific components can be housed separately from shared components. As discussed further below, shared components and/or vehicle specific components with a same form factor can be housed in the first electrical sub-assembly 108A. Vehicle specific components with different form factors can be housed in the second electrical sub-assembly 108B. A modular system can combine the battery assembly 100 and/or an axle drive assembly 112 which can be placed in communication with each other. A modular system can combine a front end accessory component assembly 104 and/or a rearward or rear end electric component assembly 108 in some embodiments. A modular system can include any two or more of the battery assembly 100, the front end accessory component assembly 104, the rear end electric component assembly 108, and/or the axle drive assembly 112. A modular system can include any two or more of the battery assembly 100, the front end accessory component assembly 104, the first electrical sub-assembly 108A, the second electrical sub-assembly 108B, and/or the axle drive assembly 112. The position of various components of these modular systems can be varied from one model to another. For example, as discussed below the battery assembly 100 can be mounted rearward of the cab 56 as in the vehicle assembly 50 (as in FIG. 1) or below the cab 56 as in the vehicle assembly 50A (as in FIG. 10).

The front end accessory component assembly 104 can include a frame 800 that is configured to mount to the chassis of the vehicle assembly 50 in the front end compartment 58. The frame 800 advantageously enables a common chassis that is design to support an internal combustion engines to be equipped with electrical power systems. The frame 800 preferably can be coupled with a mount features, e.g., plate(s), bracket(s), or rib(s) that are located in space to be positionable at, adjacent to or on a surface of the chassis or even in some applications directly on engine mount portions of the chassis in the front end compartment 58. If placed on the surface of the chassis, the plate(s), bracket(s), or rib(s) can be secured at pre-existing holes or at holes that are formed in the chassis for the front end accessory component assembly 104. The overall volume and shape as well as the mount features coupled to the frame 800 enable the front end accessory component assembly 104 to be directly placed in the front end compartment 58 and coupled to the chassis of the vehicle assembly 50 without significant or any modification of the structure surrounding the front end compartment.

The front end accessory component assembly 104 also can have one or more vehicle accessories coupled therewith so that when the frame 800 is coupled to the frame assembly 54, the accessories are simultaneously mounted to the frame assembly 54 or other chassis component at the same time that the frame 800 is mounted thereto. The front end accessory component assembly 104 can include a first vehicle accessory 804 that can be a heat exchanger, such as a chiller for controlling the temperature of coolant within an acceptable operational range. The heat exchanger 804 can include and/or be in fluid communication with fluid conduits that can be disposed between the front end accessory component assembly 104 and the battery assembly 100. The coolant conduits are configured to convey cooling fluid or coolant from the heat exchanger 804. As discussed above, the symmetry of the battery assembly 100 about the longitudinal axis A2 enables such conduit(s) to be fluidly coupled to either side of the battery assembly that is parallel to the longitudinal axis A2 such that the battery assembly can have two equivalent positions about a vertical axis. In some variations, the battery assembly 100 has a dedicated front side and the cooling fluid conduits can be connected such that upstream (cooler) portion of a cooling loop connects to the front side of the battery assembly 100. In other variations, a battery assembly 100 with a dedicated front side can be connected such that upstream (cooler) portion of a cooling loop connects to the rear side of the battery assembly 100.

The front end accessory component assembly 104 can include a second vehicle accessory 808 that serves a different function from the first vehicle accessory 804. For example, the second vehicle accessory 808 can include an electrical accessory such as a fluid pump to convey coolant from the heat exchanger, which is one example of the first vehicle accessory 804 of the front end accessory component assembly 104 to the battery assembly 100. The second vehicle accessory 808 could be one or more of an air compressor, a current driven component, a controller for a thermal system, a power steering fluid pump, a heater core, a voltage converter, a fan, power distribution unit for high voltage uses, power distribution unit for low voltage uses, and any other sort of controller that receives electric current or that controls an aspect of the operation of the battery assembly 100 or another electrical component. The first vehicle accessory 804 and the second vehicle accessory 808 could both be electrical components such as those listed above or elsewhere herein. The first vehicle accessory 804 and the second vehicle accessory 808 could both be thermal management components, such as heat exchangers in some applications.

As explained in greater detail below, the modular electric vehicle system shown in FIGS. 1-2 combines the front end accessory component assembly 104 and the battery assembly 100 such that front end accessory components can be placed in electrical communication and/or in fluid communication with the battery assembly 100. In some variations modular systems combine the front end accessory component assembly 104, the rear end electric component assembly 108, and/or one or both of the first electrical sub-assembly 108A and the second electrical sub-assembly 108B such that thermal management, current supply or component control can be coordinated among these assemblies. As discussed further below, a thermal management system can include coolant loop branches that provide coolant pumped from the front end accessory component assembly 104 to one or more than one rearward electric component assembly and/or an axle drive assembly 112. Modular systems can combine the battery assembly 100 with one or more of the front end accessory component assembly 104, the rear end electric component assembly 108, or the axle drive assembly 112. Current can be supplied from the battery assembly 100 to the front end accessory component assembly 104 and/or one or more of the first electrical sub-assembly 108A, second electrical sub-assembly 108B, and a load such as the axle drive assembly 112.

FIG. 2 illustrates that in another sense a modular system can be provided with two or more battery assemblies 100. The battery assembly 100 in solid lines is shown to be augmented by a second battery assembly 100 in dashed lines. The second battery assembly 100, illustrated in dashed line, can be located behind a first battery assembly 100. The battery assemblies 100 can be mounted in a linear array along the longitudinal axis A1 of the vehicle assembly 50. Although not shown in FIG. 2, a location for a second or subsequent battery assembly 100 can be forward of the location of the solid line battery assembly 100. A forward location can be directly under the cab 56 in a modular system with one, two, or more than two battery assemblies 100. When disposed directly under the cab 56 (as in FIG. 10) the battery assembly 100 can advantageously have one or more steps directly mounted thereon to enable a driver or passenger to enter or exit the cab 56. As discussed further below a lower step and an upper step can be integrated into a step assembly that is supported directly by a housing of the battery assembly 100 to enable battery units in the battery assembly 100 and the step assembly to be simultaneously attached to the frame assembly 54 to make the assembly of the modular system or of the battery assembly 100 to the vehicle assembly 50 more efficient for the end user. In some cases, modular systems can be formed from a small number of variants of the battery assembly 100, such as providing one or more battery assembly 100 with one or more steps and one or more battery assembly 100 without steps, which variant can be combined in a system based on the need for or the positions of steps. Mounting the steps directly on the battery assembly 100 can enable the vehicle assembly 50 to have a smaller lateral profile by eliminating separate support members to support the steps.

In another modular system, the front end accessory component assembly 104 is not provided. Instead, front end accessories are mounted in another manner, e.g., separately within the front end compartment 58 or elsewhere at other locations of the vehicle assembly 50. A modular system can include one or more battery assemblies 100 and the rear end electric component assembly 108. A modular system can include a plurality of battery assemblies 100 to provide for greater range from a fully charged condition to a fully depleted condition than in a system with only one battery assembly 100. The battery assemblies 100 are advantageously configured for flexible connection to the vehicle assembly 50, e.g., in a forward facing direction on the frame assembly 54 or in a rearward facing direction on the frame assembly 54. In some cases, one of the battery assembly 100 can be forward facing and another can be rearward facing. The battery assembly 100 can be symmetrical such that forward and rearward facing mounting includes providing the longitudinal axis A2 transverse to, e.g., perpendicular to the longitudinal axis A1. The battery assembly 100 can be asymmetrical as to system connections, e.g., with dedicated coolant inflow manifolds such that forward facing provides a dedicated inflow manifold side of the battery assembly 100 forward of a dedicated fluid outflow manifold when installed on the frame assembly 54. The battery assembly 100 can be asymmetrical as to electrical connection such that the power cables are only attached at one side of the battery assembly 100.

The flexibility in connection fosters a modular system that can allow the battery assembly 100 to be mounted to the frame assembly 54 as space permits. The symmetry of the battery assembly 100 about the longitudinal axis A1, when provided, allows the battery assembly 100 to have the same weight balance regardless of which of the long faces is forward facing when the battery assembly 100 is installed on the frame assembly 54. In some cases, heat transfer systems of the battery assembly 100 allow fluid to deliver coolant to a coolant flow path in the battery assembly 100 from either of two manifolds at the ends of the coolant flow paths. This can allow the end user to determine whether to dedicate a shorter coolant conduit to the cooler side or to the hotter side of the battery assembly 100. A longer conduit on the hotter side of the battery assembly 100 may enable some heat to dissipate before entering a heat exchanger, which could enable a smaller or less costly heat exchanger to be used.

II. Front End Accessory Component Assemblies

Figure 3:
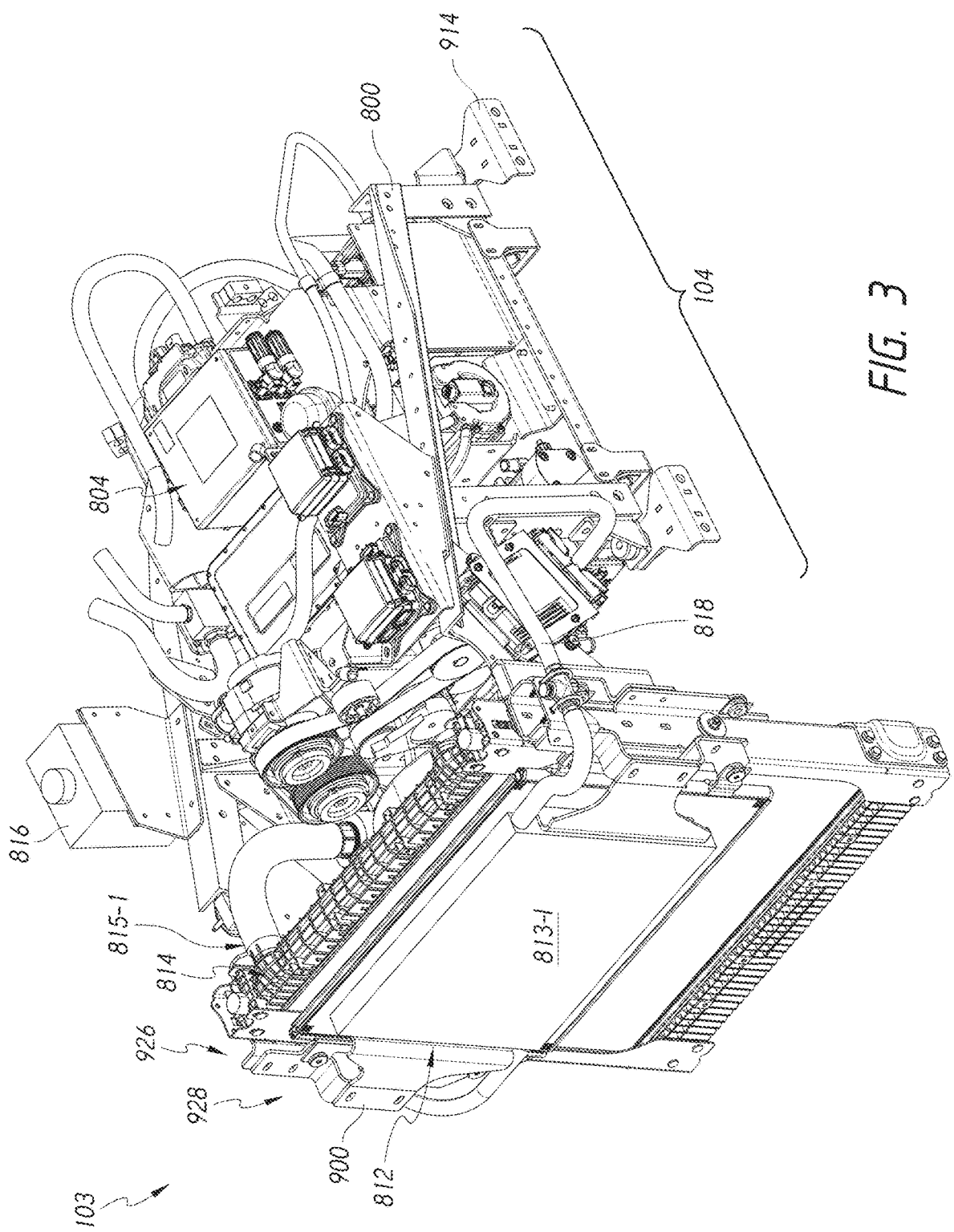
FIG. 3 is a front perspective view of a front end assembly that includes accessory component assemblies configured to simultaneously connect the multiple components to a vehicle assembly and enable such components to be integrated into subsystems of the vehicle.
Figure 4:
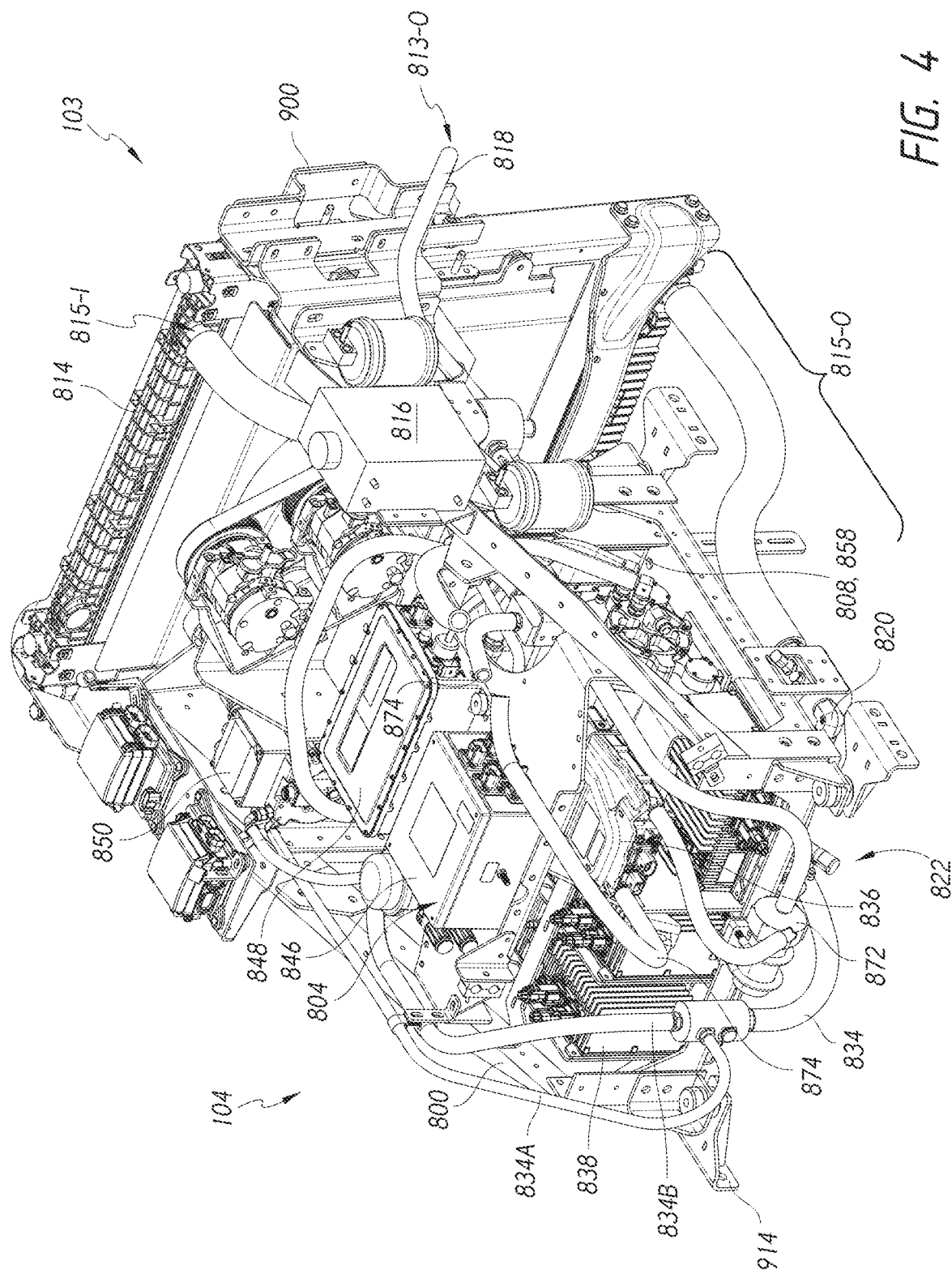
FIG. 4 is a rear perspective view of the front end assembly of FIG. 3.
Figure 4A:
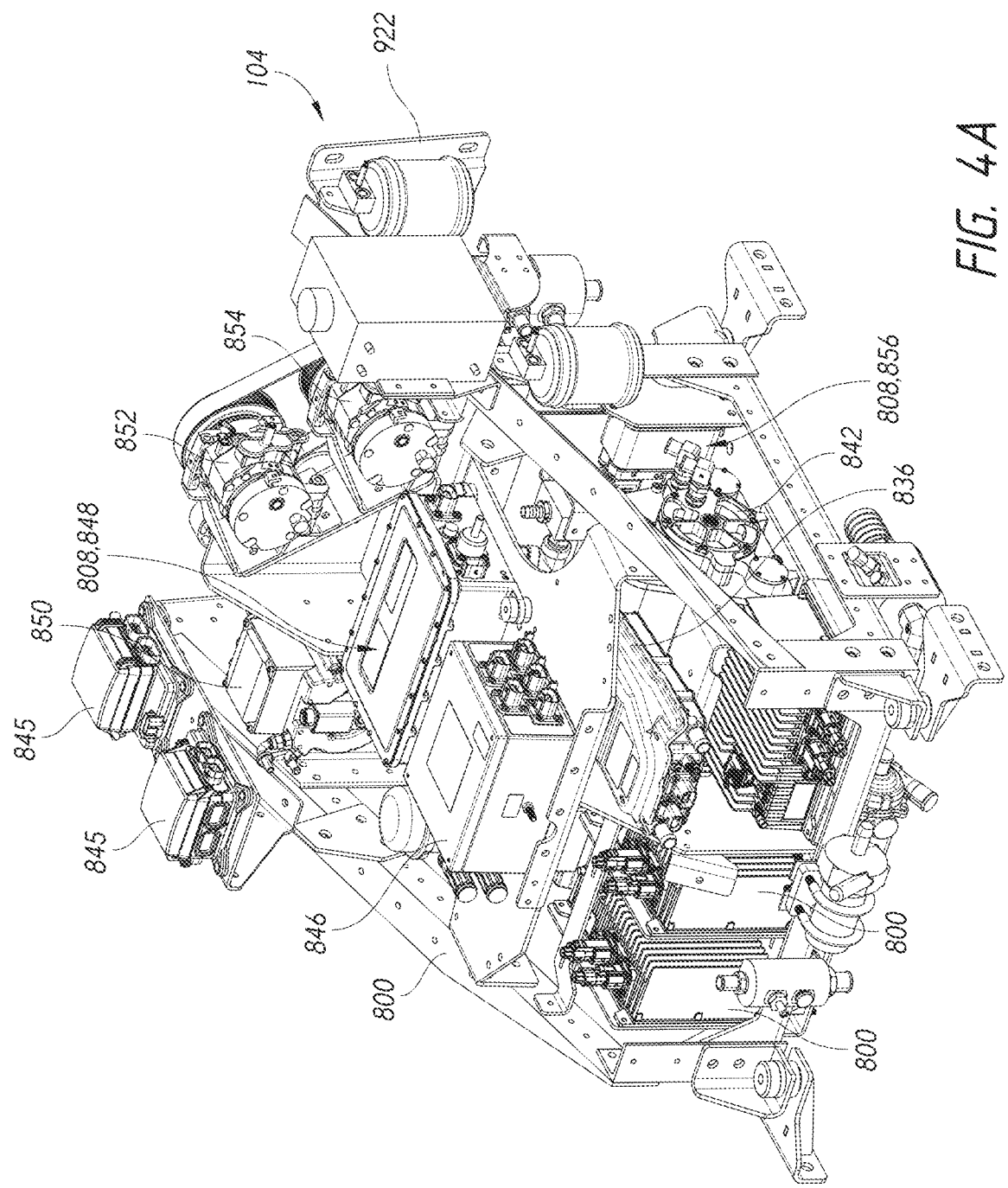
FIG. 4A is a rear perspective view of a front end accessory component assembly of the front end assembly of FIG. 3.

FIGS. 3-4 show one example of a front end assembly 103 that can include a front end accessory component assembly 104. The frame 800 of the front end accessory component assembly 104 is configured for mounting a plurality of components to the vehicle assembly 50. The frame 800 can support the first vehicle accessory 804 and the second vehicle accessory 808 as discussed above. The first vehicle accessory 804 can include a heat exchanger or other component of a thermal management system. The second vehicle accessory 808 can include one or more electrical component, as discussed above. The first vehicle accessory 804 and the second vehicle accessory 808 can be structurally mounted to the vehicle assembly 50 following assembly of these components or systems to the frame 800.

Figure 7:
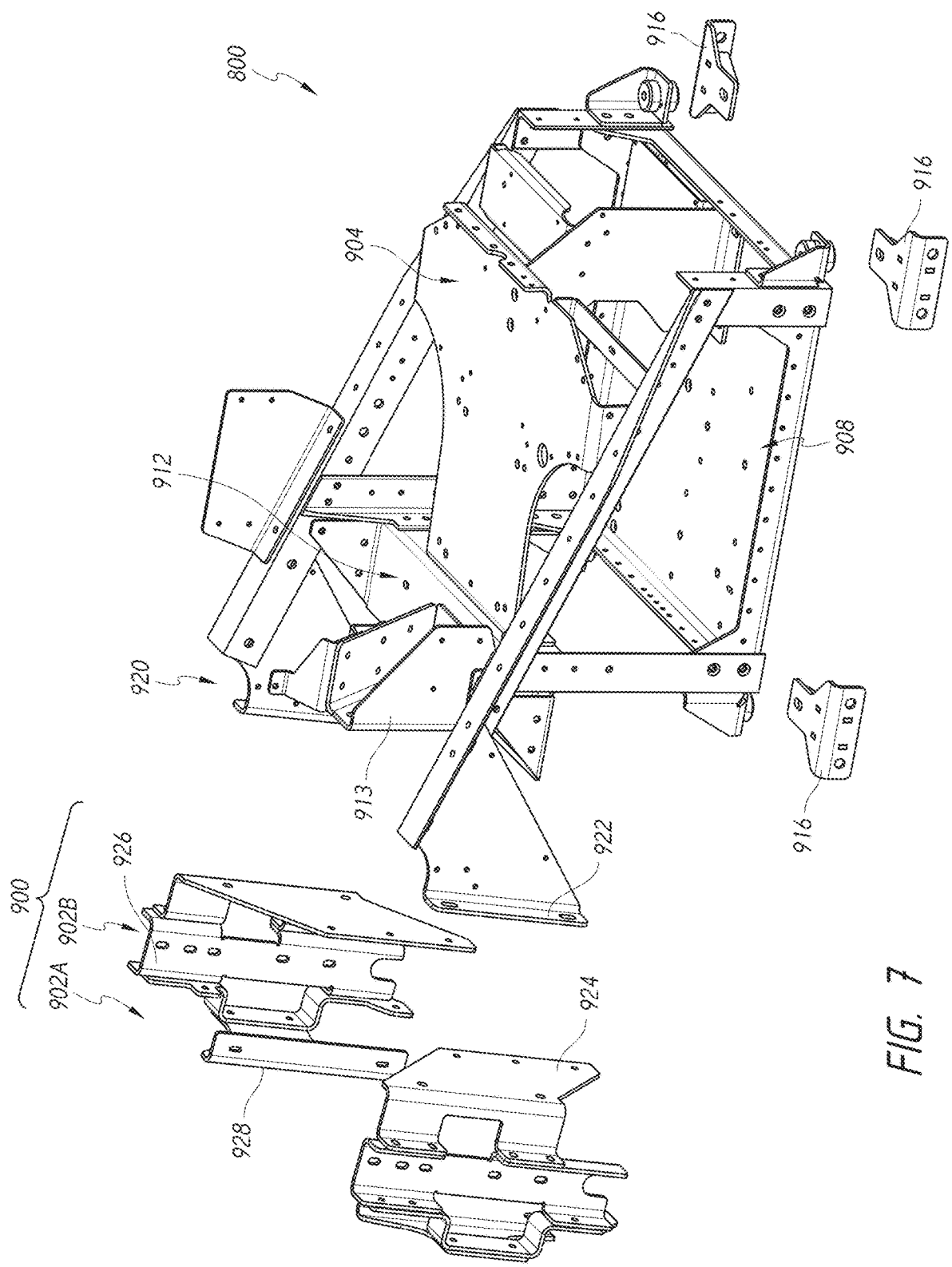
FIG. 7 is a top perspective view of a frame configured to be mounted in a front end compartment to simultaneously mount multiple components in a front end compartment of a vehicle assembly.
Figure 8:
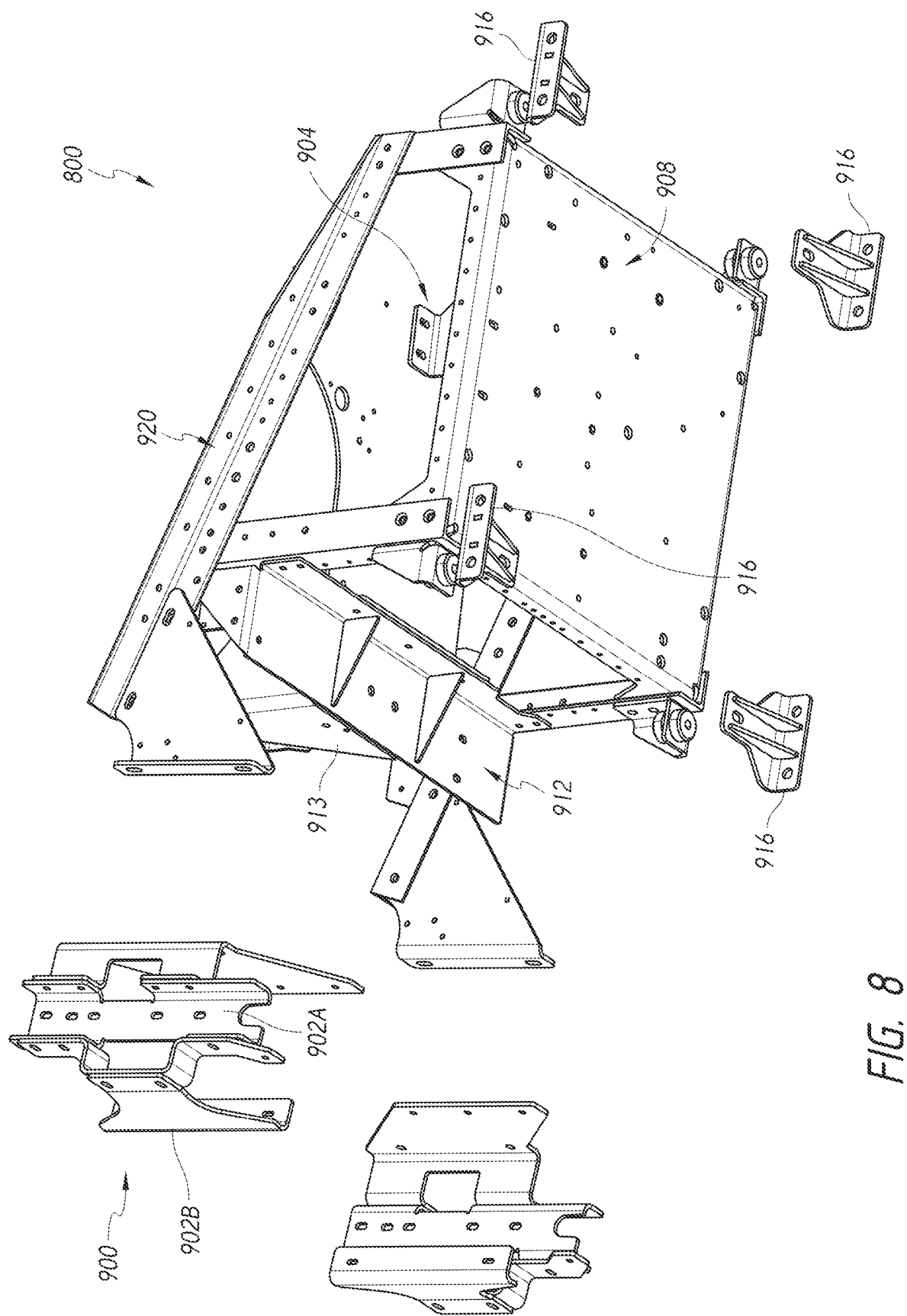
FIG. 8 is a bottom perspective view of the frame shown in FIG. 7.
Figure 9:
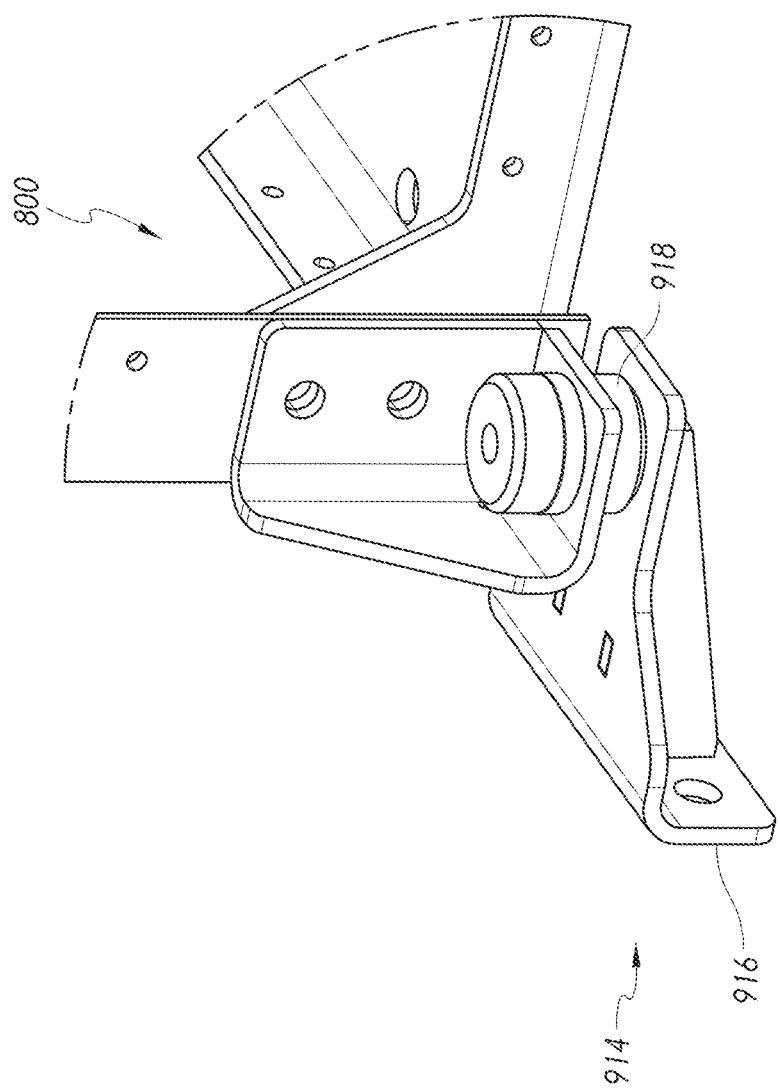
FIG. 9 is a perspective view of one of a plurality of system mounts of the frame shown in FIG. 7.

FIGS. 7-9 shows the frame 800 shown in greater detail. The frame 800 includes a multi-area structure for mounting a plurality of components to the frame 800. In one example, the frame 800 is configured to be coupled to a heat exchanger frame 900 that can be coupled to a generally forward location of the front end accessory component assembly 104. The heat exchanger frame 900 can be disposed to be located adjacent to, e.g., immediately behind a front grill of the vehicle assembly 50 such that airflow can reach one or more heat exchangers. In one approach, the frame 800 and the components mounted thereto can be secured within the front end compartment 58 and the heat exchanger frame 900 can be coupled with the frame 800 thereafter.

The frame 800 also can include a first tray 904, a second tray 908 and a third tray 912 in one embodiment. One or more components can be mounted to one or more of the first tray 904, second tray 908, and third tray 912. The first tray 904 can provide upper area of the frame 800 where components can be more easily accessed behind the heat exchanger zone 900. An upper surface of the first tray 904 can provide a support surface for one or more components, e.g., for components of an electrical sub-system of the front end accessory component assembly 104. The second tray 908 can provide an area for supporting components below the first tray 904. The second tray 908 will be less accessible than the first tray 904 so components on the second tray 908 may be selected to include those components that would benefit from more frequent service or repair. The separation between the top surface of the second tray 908 and the bottom surface of the first tray 904 can enable one or more components to be mounted to the bottom of the second tray 908 immediately above one or more components mounted to the top surface of the second tray 908. The first tray 904 and the second tray 908 each can include one or more, e.g., an array of holes formed from top to bottom surfaces thereof for mounting purposes.

The third tray 912 can be located generally between the first tray 904 and heat exchanger frame 900 when the frame 900 is coupled to the frame 800 The third tray 912 is relatively easily accessible in the front end compartment 58 in embodiments where the third tray 912 is located immediately behind the heat exchanger frame 900. The third tray 912 can be wider than it is deep. That is, the lateral dimension of the frame 800 in the vicinity of the third tray 912 can be larger than the longitudinal direction, providing a shallow shelf area. In this context, the longitudinal direction corresponds to the longitudinal axis A1 of the vehicle assembly 50 when the front end accessory component assembly 104 is mounted in the front end compartment 58.

The third tray 912 can be provided with a vertical extension 913. The vertical extension 913 can include an A or V shaped member that raises up from the top surface of the third tray 912 providing two or more surfaces that are exposed from the top of the frame 800, which surfaces can enable mounting of components to the frame 800. The vertical extension 913 can have a combined surface area on the two or more surfaces that is greater than the span of the third tray 912 to which the vertical extension 913 is coupled. As discussed further below, the vertical extension 913 can have one, two, or more than two components of the front end accessory component assembly 104 mounted thereof.

The heat exchanger frame 900 can be separated into multiple zones for separate heat exchangers. For example a forward heat exchanger support 902A can be provided that is disposed forward of a rear heat exchanger support 902B. The forward heat exchanger support 902A can be used to support a heat exchanger that is in need of greater access to cooling air. The forward heat exchanger support 902A can support a smaller heat exchanger or one that provides the cooling requirements of a component that is generating more heat. The rear heat exchanger support 902B can support a heat exchanger that can operate well with lesser cooling air access. The rear heat exchanger support 902B can support a heat exchanger that is larger than the heat exchanger supported in the forward heat exchanger support 902A. The rear heat exchanger can operate in the presence of waste heat generated by the forward heat exchanger.

The frame 800 advantageously includes a frame array 920 that supports and joins two or more of, the first tray 904, the second tray 908, and the third tray 912. The frame array 920 also can join the frame 800 to the heat exchanger frame 900 as discussed further below. The frame array 920 can include vertical, horizontal, and diagonal L-shaped members. The frame array 920 can include one or more plates to join two or more of the trays and zones together. The frame array 920 can include one or more or an array of openings to allow additional components to be mounted thereto.

The heat exchanger frame 900 can include a frame interface 924 configured to mate to a heat exchanger frame interface 922 of the frame 800. The frame interface 924 and the heat exchanger frame interface 922 can include transverse flange portions. The transverse flange portions can include openings or apertures configured to receive bolts to connect the heat exchanger frame interface 922 and the frame interface 924 together. The rear heat exchanger support 902B can include a rearward flange 926 that is configure to mate with the heat exchanger 814. The forward heat exchanger support 902A can include a forward flange 928 configured to mate with the heat exchanger 812. The rearward flange 926 advantageously is connected to the frame interface 924. The forward flange 928 is connected to the rearward flange 926. The frame interface 924 can include a generally triangular plate member coupled at one end with the frame array 920, wherein a transverse expanse can be secured to the frame interface 924.

The trays and or the frame array 920 can be coupled with or can include one or more, e.g., two, three, or four system mounts 914. The bracket 916 can include horizontal faces and vertical faces for positioning one or more bolt or other fastener apertures in a desired position in space to mate with a mount member or feature within the front end compartment 58 of the vehicle assembly 50. The bracket 916 can be supported on a lower side thereof by one or more angle members. The bracket 916 can be coupled with a vibration isolator 918 that is disposed between the system mounts 914 and the nearest connecting member of the frame array 920. The vibration isolator 918 can include a polymeric member that is sufficiently resilient for a sufficient operational life to provide for muting or reduction of road, vehicle, and engine vibrations that would otherwise be transferred to components of the front end accessory component assembly 104. The vibration isolator 918 can be made of rubber, a rigid plastic or another member with suitable shock absorbing and durability properties. The vibration isolator 918 can be formed as cylindrical members disposed between the bracket 916 and a member of the frame array 920. A neck region of the vibration isolator 918 can extend through the thickness of the bracket 916 in an opening thereof. A fastener can securely connect the frame array 920 to the bracket 916 by compression of the vibration isolator 918 between the bracket 916 and a member of the frame array 920.

The system mounts 914 can be configured to mate to a chassis of an existing vehicle design. The bracket 916 can be configured to reach a wall of the front end compartment 58. Apertures can be drilled through the chassis wall to facilitate such mounting. In some cases, the brackets 916 are configured to reach engine mount locations in the front end compartment 58 such that existing support points that would otherwise be used for mounting a combustion engine can be used to support the front end accessory component assembly 104. The lateral face of the bracket 916 can be disposed adjacent to engine mount locations and bolts or other fasteners can be secured through the openings in the bracket 916 and through corresponding openings at the mount locations in the front end compartment 58.

The frame 800 and the heat exchanger frame 900 can support a number of vehicle components. The frame 800 enables two or more components to be simultaneously placed in the front end compartment 58.

A. Electrical Accessory Device Integration

FIGS. 2-6 show that the front end accessory component assembly 104 can support electrical devices and/or controllers for electrical devices. Some of these devices support the function of thermal management systems for removing heat from vehicle components, as discussed further below.

Figure 5:
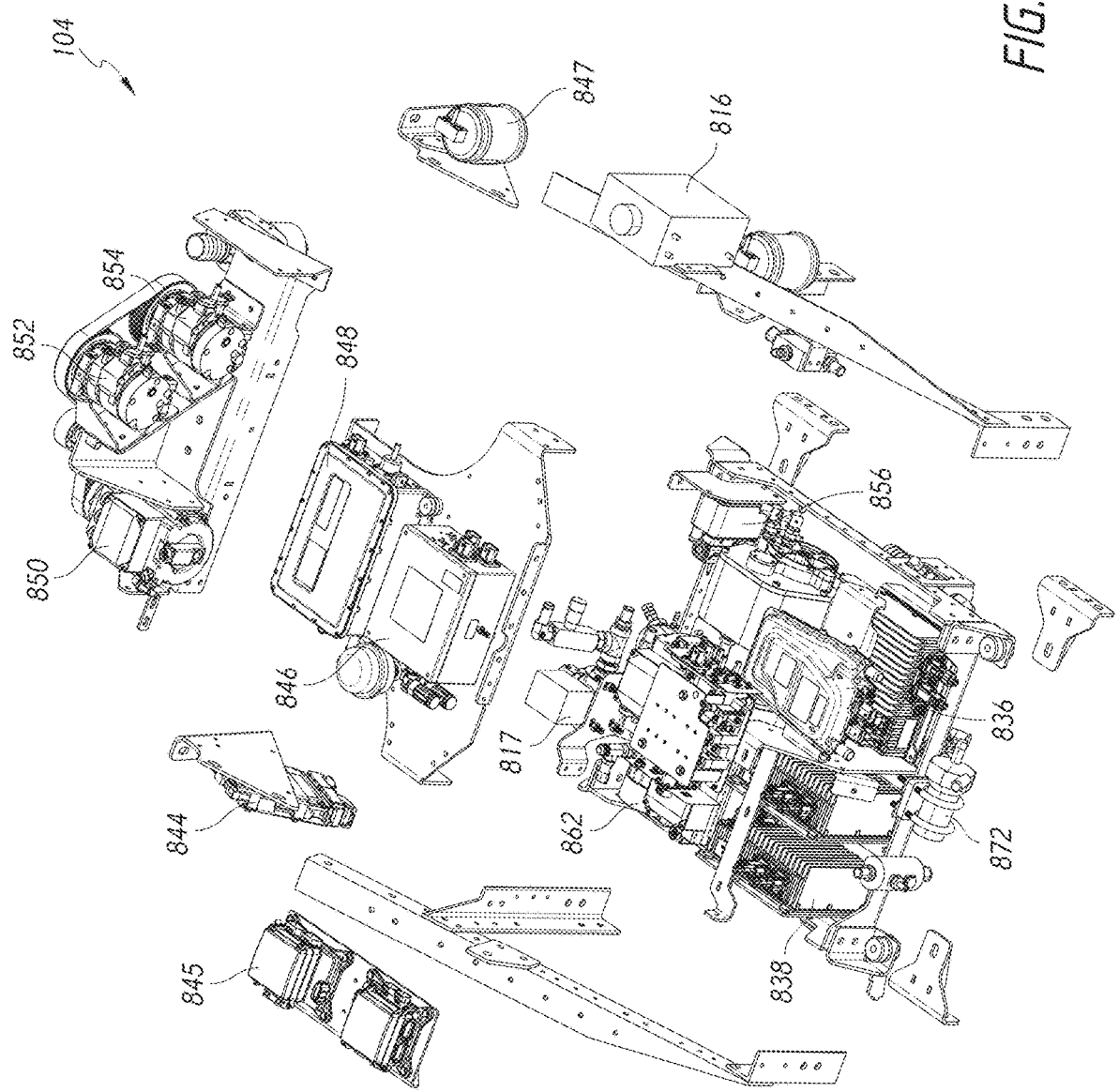
FIG. 5 is a top exploded view of a frame and a plurality of vehicle accessories.

FIG. 5 shows a number of electrical components of one embodiment of the front end accessory component assembly 104. The front end accessory component assembly 104 can include an accessory power distribution unit 846 and a power converter 848. The accessory power distribution unit 846 and the power converter 848 can be mounted in an upper area of the frame 800, e.g., n the first tray 904. The power converter 848 can be mounted forward of the accessory power distribution unit 846. The power converter 848 can provide a voltage conversion function by which the voltage from the battery assembly 100 can be converted from higher voltage to lower voltage. The battery assembly 100 can output high voltage for certain high voltage components, e.g. for the axle drive assembly 112. However, the battery assembly 100 can also support the operation of a number of lower voltage components mounted on the front end accessory component assembly 104. Current output by the battery assembly 100 can flow directly to the accessory power distribution unit 846 in some embodiments. In other embodiments the power distribution to the front end accessory component assembly 104 is via another assembly located in a rearward portion of a vehicle, such as within the first electrical sub-assembly 108A discussed below in connection with FIGS. 10 and 13-17. The accessory power distribution unit 846 can include circuitry that take an input current from the power converter 848 and provides portions of that current to many or in some cases all of the rest of the electrical components mounted on the front end accessory component assembly 104.

One component that receives current from the accessory power distribution unit 846 is an accessory motor 850. The accessory motor 850 can include an output shaft that drives a transmission component, such as a belt, to provide rotation of a working shaft of an air conditioner compressor 852 and of a battery chiller compressor 854. The air conditioner compressor 852 can be in a loop with a dryer receiver 847, for example. The dryer receiver 847 can be mounted to an outside surface of the frame 800, e.g., to a span of the frame array 920. The compressors driven by the accessory motor 850 provide the function of compressing low pressure refrigerant gas in a heat transfer circuit, as discussed further below. The accessory motor 850 can be mounted to a lateral portion of the third tray 912. One or both of the air conditioner compressor 852 and the battery chiller compressor 854 can be mounted to the vertical extension 913 of the third tray 912. In one embodiment, the accessory motor 850 is mounted on one side of the vertical extension 913 and both of the air conditioner compressor 852 and the battery chiller compressor 854 are mounted on an opposite side of the vertical extension 913.

In one embodiment, a plurality of electrical components are mounted below the first tray 904, e.g., to the second tray 908. One or more motor inverters 838 can be mounted to the second tray 908. The motor inverters 838 can control the operation of the accessory motor 850 and of an air compressor motor 840. The air compressor motor 840 is also connected to the second tray 908 in one embodiment. The air compressor motor 840 can include an output shaft that is engaged with an air compressor 842. The air compressor 842 can supply pressurized air to components such as air brakes in the vehicle assembly 50.

A fluid heater 836 can be mounted on or above the second tray 908, e.g., a flange connected to the frame array 920. The fluid heater 836 can be part of a heat transfer circuit to provide a source of heat to a cab heater, as discussed further below.

Additionally, a power steering pump 862 can be mounted to the second tray 908. The power steering pump 862 assists the driver in steering as is known.

Figure 6:
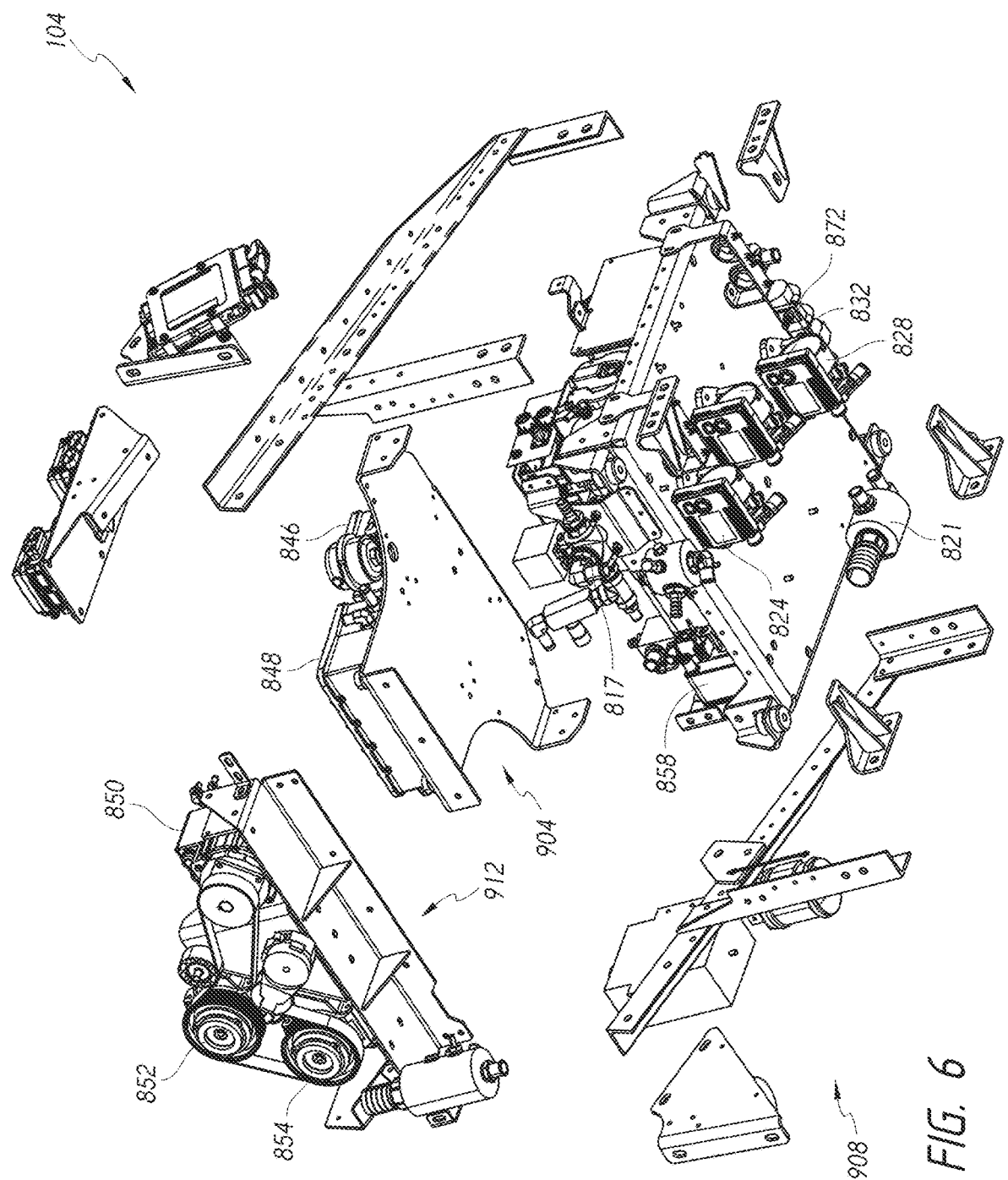
FIG. 6 is a bottom exploded view of a frame and a plurality of vehicle accessories.

FIG. 6 shows that the second tray 908 also can support one or more electrical components on a lower side thereof. A first coolant pump 824 can be supported on a lower side of the second tray 908 in one embodiment. The first coolant pump 824 can supply coolant to a first coolant loop as discussed further below. A second coolant pump 828 can be disposed on the lower side of the second tray 908 rearward of the first coolant pump 824. The second coolant pump 828 can supply coolant to a second coolant loop as discussed further below. A third coolant pump 832 can be disposed on the lower side of the second tray 908. The third coolant pump 832 can supply coolant to a third coolant loop as discussed further below.

In some embodiments, components can be mounted to side surfaces of the frame 800, e.g., to a side surface of the second tray 908. For example, a heater core pump 872 can be mounted to a rear side surface of the second tray 908. The heater core pump 872 can supply a coolant to a circuit for supplying heat to a cab of the front end compartment 58.

Other components can be mounted to the frame 800. Light and/or low profile components can be mounted to side surfaces of the frame 800, e.g., to lateral portions of the frame array 920. A supervisor 844 can be mounted to the second coolant loop 820, e.g., to a lateral portion of the heat exchanger frame interface 922. A fuse relay 845 can be mounted to a small shelf on a lateral side of the frame array 920 of the frame 800. The fuse relay 845 can be disposed on the top of a shelf that partially overhangs the accessory motor 850.

B. Coolant Loop Integration

FIGS. 2-6 show that the front end accessory component assembly 104 can support components of a thermal management system that supports removing heat from components of the vehicle assembly 50. The front end accessory component assembly 104 can coordinate thermal management for the vehicle assembly 50. Thermal control components can be coupled with the frame 800 of the front end accessory component assembly 104. The thermal control components can manage heat from heat generating components mounted to the frame 800 or mounted to the frame assembly 54 elsewhere on the vehicle assembly 50. More particularly, the front end accessory component assembly 104 can serve cooling fluid to the battery assembly 100. The front end accessory component assembly 104 can serve cooling fluid to the rear end electric component assembly 108. The front end accessory component assembly 104 can serve cooling fluid to the axle drive assembly 112, either directly or through a manifold integrated into the rear end electric component assembly 108. The frame 800 of the front end accessory component assembly 104 and the heat exchanger frame 900 of the front end assembly 103 can efficiently integrate core portions of one or more coolant loops.

A plurality of coolant conduits or loops can be provided in the vehicle assembly 50, which are fed and controlled from the front end accessory component assembly 104. The front end assembly 103 can include a heat exchanger 812 disposed in the forward heat exchanger support 902A. The heat exchanger 812 can be fluidly coupled with a first coolant loop 818. Core portions of the first coolant loop 818 not including the heat exchanger 812 can be secured to the frame 800 of the front end accessory component assembly 104. A heat exchanger outlet 813-O can supply fluid to the first coolant loop 818. The first coolant loop 818 can have a first segment between the heat exchanger outlet 813-O and a first coolant pump 824. The first coolant pump 824 can be mounted to the frame 800, e.g., to an underside of the second tray 908 as discussed above. The outlet of the first coolant pump 824 can supply the first coolant loop 818 downstream thereof. A manifold mounted on the front end accessory component assembly 104 can join a volume of fluid from a coolant reservoir 816 with the volume of fluid from the heat exchanger outlet 813-O to assure adequate supply to the battery assembly 100. The output of the first coolant pump 824 in the first coolant loop 818 can be fluidly coupled to a manifold of the battery assembly 100 to supply cooling fluid to heat generating components thereof, e.g., to battery units disposed therein. A return line portion of the first coolant loop 818 can be disposed between the battery assembly 100 and the heat exchanger inlet 813-I. A valve, e.g., a three way valve 817, can be used to allow a volume of coolant from a chiller 858 (or other heat exchanger) to be merged to the flow in the return portion of the first coolant loop 818 between the battery assembly 100 and the hot side of the heat exchanger 812. In one embodiment, at least a portion of the return flow in the first coolant loop 818 from the outlet of the battery assembly 100 can be diverted to the chiller 858 in a conduit. The flow diverted to the chiller 858 can be cooled as heat is removed from the flow within the chiller 858. A control system can be included in the front end accessory component assembly 104 whereby flow to the chiller 858 is provided when the heat exchanger 812 (e.g., including a radiator) is unable to remove enough heat from the first coolant loop 818.

In one arrangement the supply and return conduits of the first coolant loop 818 are supported by a coolant support member 819 that can be mounted to the frame assembly 54. The coolant support member 819 can support the conduit of the first coolant loop 818 in any suitable manner. For example, the coolant support member 819 can support a generally hotter coolant return conduit of the first coolant loop 818 at an inboard position and a generally cooler supply conduit of the first coolant loop 818 at a generally outboard position. The hotter return conduit of the first coolant loop 818 can be disposed between the cooler supply line and the longitudinal axis A1. In one embodiment the, hotter return line of the first coolant loop 818 is disposed at or adjacent to the longitudinal axis A1 and the cooler conduit is lateral of the longitudinal axis A1 and/or the longitudinal axis A1 and the hotter conduit of the first coolant loop 818. As discussed above, the first coolant loop 818 can include the three way valve 817 to divert at least some of the flow from the outlet of the battery assembly 100 to the chiller 858 to enhance removal of heat in the first coolant loop 818 as may be needed in certain conditions. After the coolant has traversed the battery assembly 100, the generally hotter fluid is returned in downstream portion of the first coolant loop 818 to the heat exchanger inlet 813-I. The first coolant loop 818 can include additional valves and manifolds to achieve the desired coolant flow path.

The front end accessory component assembly 104 includes a second coolant loop 820 that can supply cooling fluid to other heat generating components of the vehicle assembly 50. The second coolant loop 820 can be coupled with a heat exchanger outlet 815-O of a heat exchanger 814 that can be supported by the heat exchanger frame 900 in the front end assembly 103. The heat exchanger outlet 815-O can include an outlet port on a lower portion of the heat exchanger 814. The heat exchanger outlet 815-O can include the outlet port and a length of conduit extending from the outlet port to a manifold 821. The manifold 821 can split the coolant flow from the heat exchanger outlet 815-O into the second coolant loop 820 and into a third coolant loop 822.

Figure 13:
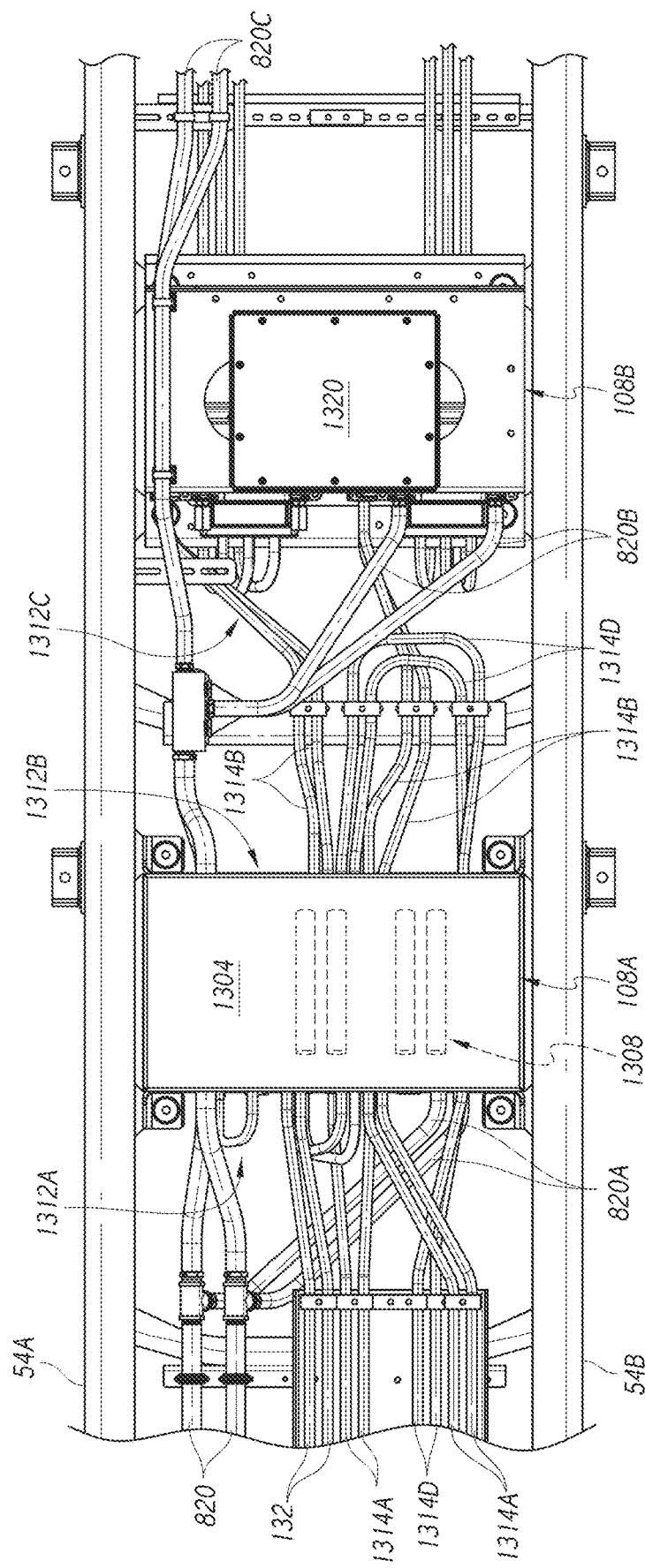
FIG. 13 is bottom view of a portion of an electric vehicle system including first and second electrical sub-assemblies.

The second coolant loop 820 extends from the manifold 821 to a second coolant pump 828 and from the second coolant pump 828 to downstream conduits that convey the cooling fluid away from the front end accessory component assembly 104 to heat generating components located elsewhere on the vehicle assembly 50. The second coolant loop 820 can extend from the front end accessory component assembly 104 to the coolant support member 819. The coolant support member 819 can support supply and return conduits of the second coolant loop 820 generally along the longitudinal axis A1 of the vehicle assembly 50. In one embodiment, the hotter return conduit of the second coolant loop 820 can be disposed between the cooler supply line and the longitudinal axis A1. In one embodiment, the hotter return line of the second coolant loop 820 is disposed at or adjacent to the longitudinal axis A1 and the cooler conduit is lateral of the longitudinal axis A1 and/or the longitudinal axis A1 and the hotter conduit of the second coolant loop 820. After the coolant has traversed the rear end electric component assembly 108, another branch of the second coolant loop 820 extends to the axle drive assembly 112. A manifold can split the supplied coolant into a first flow to cool components of the rear end electric component assembly 108 and a second flow to cool the axle drive assembly 112. FIG. 13 illustrates embodiments in which the second coolant loop 820 is split into a coolant loop branch 820A to supply coolant to a first electrical sub-assembly 108A, a coolant loop branch 820B to supply coolant to a second electrical sub-assembly 108B, and a coolant loop branch 820C to supply coolant to a heat generating electrical load, such as the axle drive assembly 112. Accordingly, these embodiments show that the front end accessory component assembly 104 can supply coolant to one or more components and to one or more assemblies located rearward of the front end accessory component assembly 104. Coolant fluid from the axle drive assembly 112 and/or from the rear end electric component assembly 108 returns to the front end accessory component assembly 104 through one or more hotter return conduits. The generally hotter fluid is returned in the downstream portions of the second coolant loop 820 to the heat exchanger inlet 815-1. The second coolant loop 820 can include additional valves and manifolds to achieve the desired coolant flow path.

FIG. 2 shows that the second coolant loop 820 extends along an upper side of the battery assembly 100. The battery assembly 100 can have a W-shaped configuration in which a first lateral portion 204 and a second lateral portion 208 extend to a higher elevation than a central portion 212. The central portion 212 can provide an upwardly oriented recess 216 that can receive the first longitudinal frame member 54A and the second longitudinal frame member 54B of the frame assembly 54. A mounting system 240 can enable a housing 200 of the battery assembly 100 to be supported on outboard lateral sides of the first longitudinal frame member 54A and the second longitudinal frame member 54B. Conduit of the second coolant loop 820 can extend through the upwardly oriented recess 216, e.g., at least partially at an elevation below the top surfaces of the first lateral portion 204 and second lateral portion 208. The coolant support member 819 can be configured to support the conduit of the second coolant loop 820 along a path inboard of the first longitudinal frame member 54A and the second longitudinal frame member 54B as shown in FIG. 2.

The third coolant loop 822 can extend from the manifold 821 to a coolant conduit between the manifold 821 and a third coolant pump 832. The third coolant pump 832 can output a flow into a third coolant conduit 834 that extends to a manifold that splits the flow into a first branch 834A and a second branch 834B. The third coolant conduit branches 834A, 834B each provide coolant flows to a plurality of downstream components. In one embodiment, the third coolant conduit branch 834B is provided through a larger conduit in which a larger portion of the flow from the third coolant conduit 834 is directed by the manifold that splits the flow into the branches. The third coolant conduit branch 834B provides flow initially to the accessory power distribution unit 846. The outflow of the third coolant conduit branch 834B out of the accessory power distribution unit 846 then flows into the air compressor 842. The outflow from the air compressor 842 flows into a return manifold 835 that merges flow into the heat exchanger inlet 815-I.

The third coolant conduit branch 834A provides a smaller portion of the flow from the third coolant conduit 834 initially into the accessory motor 850. The outflow of the cooling passage through the accessory motor 850 flows in the third coolant conduit branch 834A to the air compressor motor 840 which is cooled thereby. The outflow of the cooling passage through the air compressor motor 840 then flows to the power steering pump 862 to provide cooling thereof. The outflow of the cooling passage through the power steering pump 862 flows to the return manifold 835 to merge with other return flow therein to return coolant to the heat exchanger inlet 815-1. The return manifold 835 is also fluidly coupled with the return passage of the second coolant loop 820 such that output coolant fluid from the rear end electric component assembly 108 and/or from the axle drive assembly 112 can be merged in the return manifold 835 with other coolant in the third coolant loop 822. Thus, the heat exchanger 814 can be seen to support flow through the second coolant loop 820 and the third coolant loop 822. The return manifold 835 can also be coupled with a supply conduit from the coolant reservoir 816 to assure the adequate volume of coolant is present in the third coolant loop 822

The foregoing describes that a significant portion of three distinct coolant loops can be mounted to the front end accessory component assembly 104 to provide a highly integrated system. The front end accessory component assembly 104 can enable simultaneous mounting of conduits, pumps, and controllers for a plurality of cooling loops. The front end accessory component assembly 104 can support cooling of components mounted on the front end accessory component assembly 104 and also on other integrated systems of an electric vehicle.

Further thermal management accessories can be integrated into the front end accessory component assembly 104. For example, climate control for the cab of the vehicle assembly 50 can be mounted on the frame 800. In one embodiment, a heater core pump 872 is provided to move a heating fluid through a heating fluid loop 874. A flow can be generated by the heater core pump 872 and can flow into the heating fluid loop 874 in an initial segment that extends from the heater core pump 872 to a fluid heater 836. The fluid heater 836 can elevate the temperature of the fluid in the heating fluid loop 874. The fluid heater 836 can produce an elevated temperature in an outflow conduit thereof that can be delivered to a heater core (not shown) that can be mounted directly to the wall of the chassis on the front end compartment 58. Heat is removed from the fluid and a return segment of the heating fluid loop 874 returns the fluid to a manifold that supplies the inflow to the heater core pump 872. The manifold is also seen in FIG. 4 to have another input that can be coupled to the coolant reservoir 816.

The frame 800 and the heat exchanger frame 900 can support many of the components of the first coolant loop 818, the second coolant loop 820, and the third coolant loop 822. The frame 800 can support many of the components of the heating fluid loop 874.

III. Further Modular Assemblies

Figure 10:
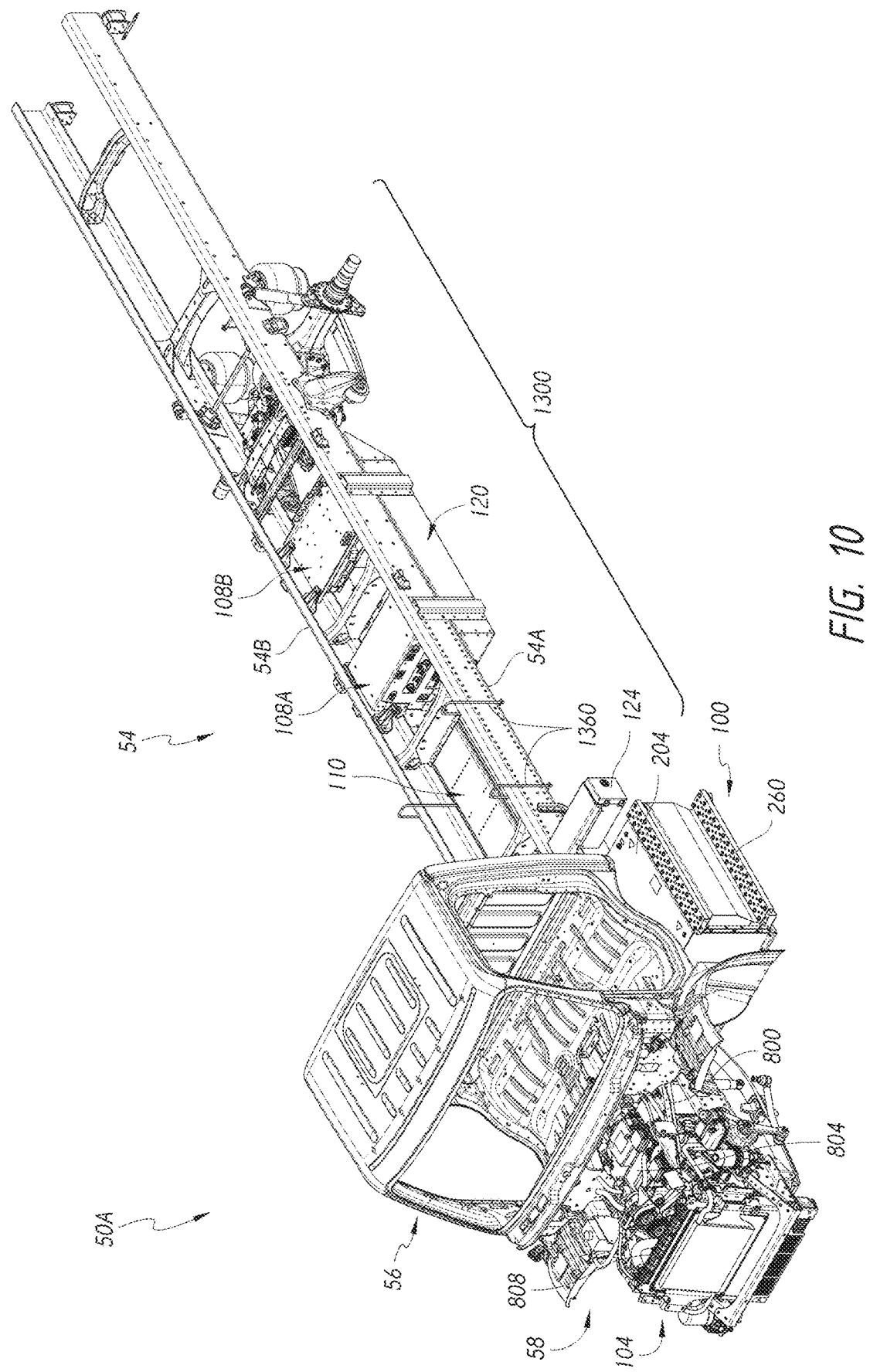
FIG. 10 is a perspective view of a vehicle assembly with additional electric vehicle system configurations.
Figure 11:
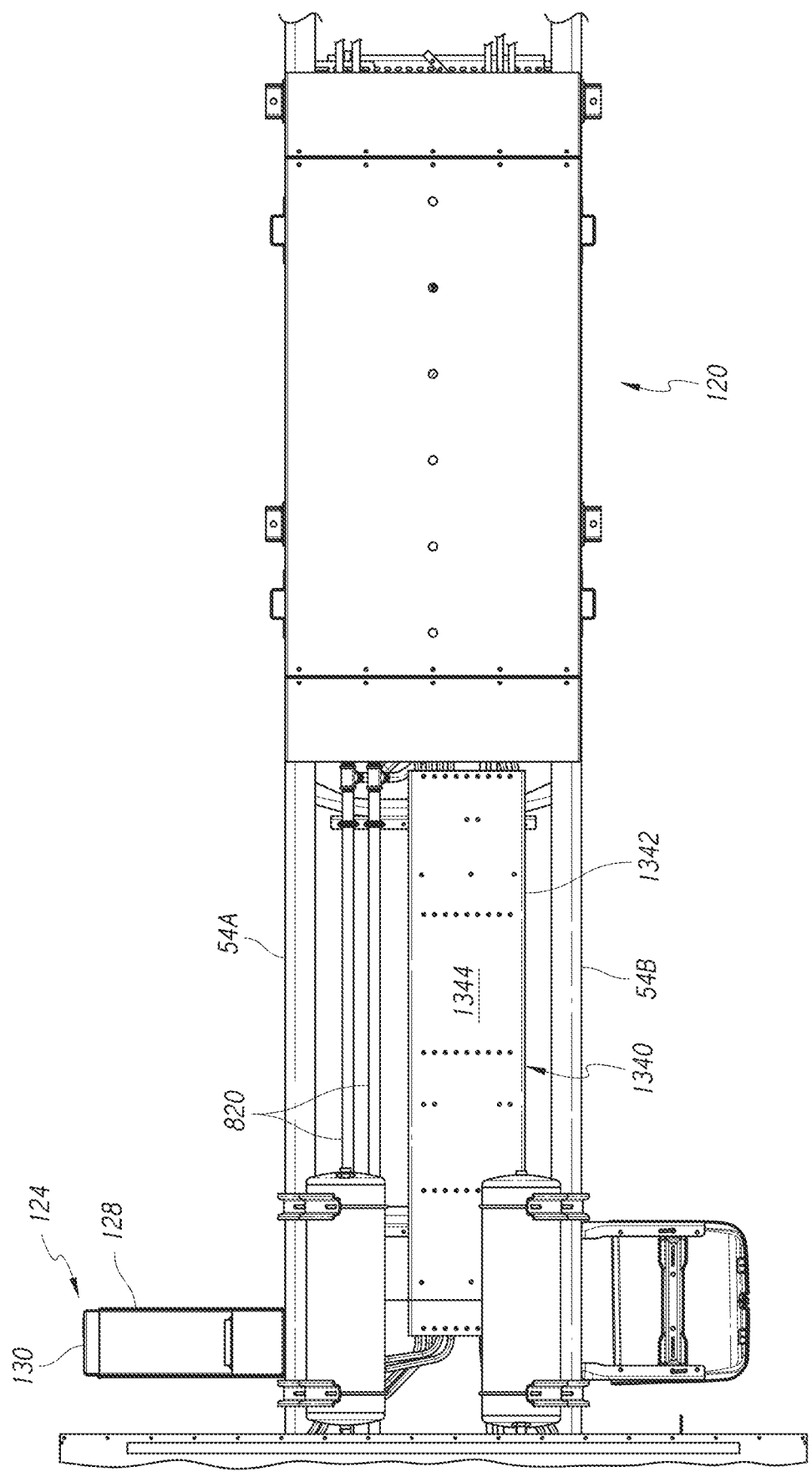
FIG. 11 is a bottom view of an electric vehicle system providing protection for high voltage cables.

FIG. 10 shows another vehicle assembly 50A. The vehicle assembly 50A is similar to the vehicle assembly 50 shown in FIGS. 1-2 other than as described differently below. Other descriptions of the vehicle assembly 50 apply to the vehicle assembly 50A and vice-versa. The vehicle assembly 50A provides an advantageous location for mounting the battery assembly 100 along the frame assembly 54. The battery assembly 100 can be mounted to a location of the frame assembly 54 that is at least partially below the cab 56 of the vehicle assembly 50. The position of the battery assembly 100 allows the step assembly 260 to be located closer to the entry point of the cab 56 than the location seen in FIG. 1. The location of the step assembly 260 shown in FIG. 10 cases entry into the cab 56. Also, the more forward location of the battery assembly 100 seen in FIG. 10 improves weight distribution as this position puts more weight on the front axle of the vehicle assembly 50 and also reduces weight on the rear axle. Together these benefits increase and can even maximize load carrying ability.

The vehicle assembly 50A is equipped with a charge receptacle 124 that is disposed on a driver side of the cab 56. The charge receptacle 124 can be an assembly including a housing 128 enclosing a spaced accessible by a door 130. The housing 128 can be elongate such that the housing can be mounted to the frame assembly 54 and can also extend sufficiently laterally to be accessible to the user. When connected to an external source, current from the external source flows through the charge receptacle 124 to a charging system. The charging system includes an AC charge circuit that is adapted to receive alternating current (AC) and to convert the AC to direct current (DC) and to direct the DC to any of the battery assembly 100 (or multiple battery assemblies). The first electrical sub-assembly 108A can include an AC to DC converter disposed therein. The charging system also can include a charge circuit that is electrically coupled with the charge receptacle 124 and that is adapted to provide a more rapid charge to any of these battery assemblies. The rapid charge circuit can be disposed in a power distribution component located adjacent to, e.g., rearward of, the battery assembly 100, as discussed further below. The rapid charge circuit can be disposed in a power distribution component located forward of the battery assembly 100. Where the rear end electric component assembly 108 is provided as a single integrated unit, the AC charge circuit and the rapid charge circuit can both be located in the same housing. The rapid charge circuit can be adapted to receive a direct current (DC) from the charge receptacle 124 in a manner that results in reaching a full charge much faster than through the AC charge circuit. However, the AC charge circuit provides the advantage that AC current may be available in more locations than a DC current source configured to charge the battery assemblies. The charge receptacle 124 is configured to receive an AC or a DC current source via a plug.

The vehicle assembly 50A also includes components for routing and protecting high voltage cables of the assembly, junctions between such cables, and other components of the assembly. For example, the charge receptacle 124 can be coupled with charging cables 132 that can extend from the housing 128 to the charging circuits, e.g., located in the rear end electric component assembly 108 or another power distribution assembly located rearward of the charge receptacle 124.

FIG. 10 shows an enhanced modularity that can be provided as to power distribution components in the vehicle assembly 50A. An electric vehicle system 1300 includes a first electrical sub-assembly 108A and a second electrical sub-assembly 108B. In one embodiment the first electrical sub-assembly 108A is configured with shared or generally applicable components and the second electrical sub-assembly 108B is configured with one or more vehicle specific power distribution components. In another embodiment the first electrical sub-assembly 108A is configured with vehicle specific components that have a shared form factor and the second electrical sub-assembly 108B is configured to house components with different form factors. The first electrical sub-assembly 108A can include a first housing 1304 configured to enclose current conveying circuits, such as fuses 1308. The fuses 1308 can be shared components that function properly on different vehicle types and configurations and with different vehicle sub-components. The first electrical sub-assembly 108A can house the AC charge circuit and/or the fast charge circuit described above. The first electrical sub-assembly 108A can house the power distribution circuitry, or power distribution unit, as discussed further below. In some cases, the fuses 1308 are examples of vehicle components that may be specific to a rear vehicle load, such as an axle drive assembly 112, but that generally have a shared form factor that fits within the first housing 1304.

The first electrical sub-assembly 108A can provide additional junction. For example an alternating current connection 1310 can be provided to connect to a cable coupled with or configured to be coupled with an AC power source. The alternating current connection 1310 can be disposed on a forward side of the first electrical sub-assembly 108A. Also, a low voltage connection 1311 can be provided for connection to a low voltage current source. The low voltage connection 1311 can supply current to control circuits disposed in the first electrical sub-assembly 108A, in the second electrical sub-assembly 108B, or in both of the electrical sub-assemblies 108A, 108B.

The second electrical sub-assembly 108B can include a second housing 1320 that can enclose vehicle or component specific power distribution components. The second housing 1320 can include one or more power converters 1324. The power converters 1324 can be configured to convert power inbound to the second housing 1320 to load specific power to the axle drive assembly 112 or other electrical load. The power converters 1324 may have different form factors as applied to different axle drive assemblies 112. By separating vehicle and/or component specific power distribution components into the second electrical sub-assembly 108B, e.g., into the second housing 1320, the electric vehicle system 1300 can rely on a greater use of shared components and assemblies while accommodating a range of different axle drive assemblies. Providing the second electrical sub-assembly 108B facilitates multiple source supply in a cost efficient manner by allowing vehicle components with different form factors disposed in the second housing 1320 while still allowing the shared components to be disposed in the first electrical sub-assembly 108A on a vehicle.

Figure 16:
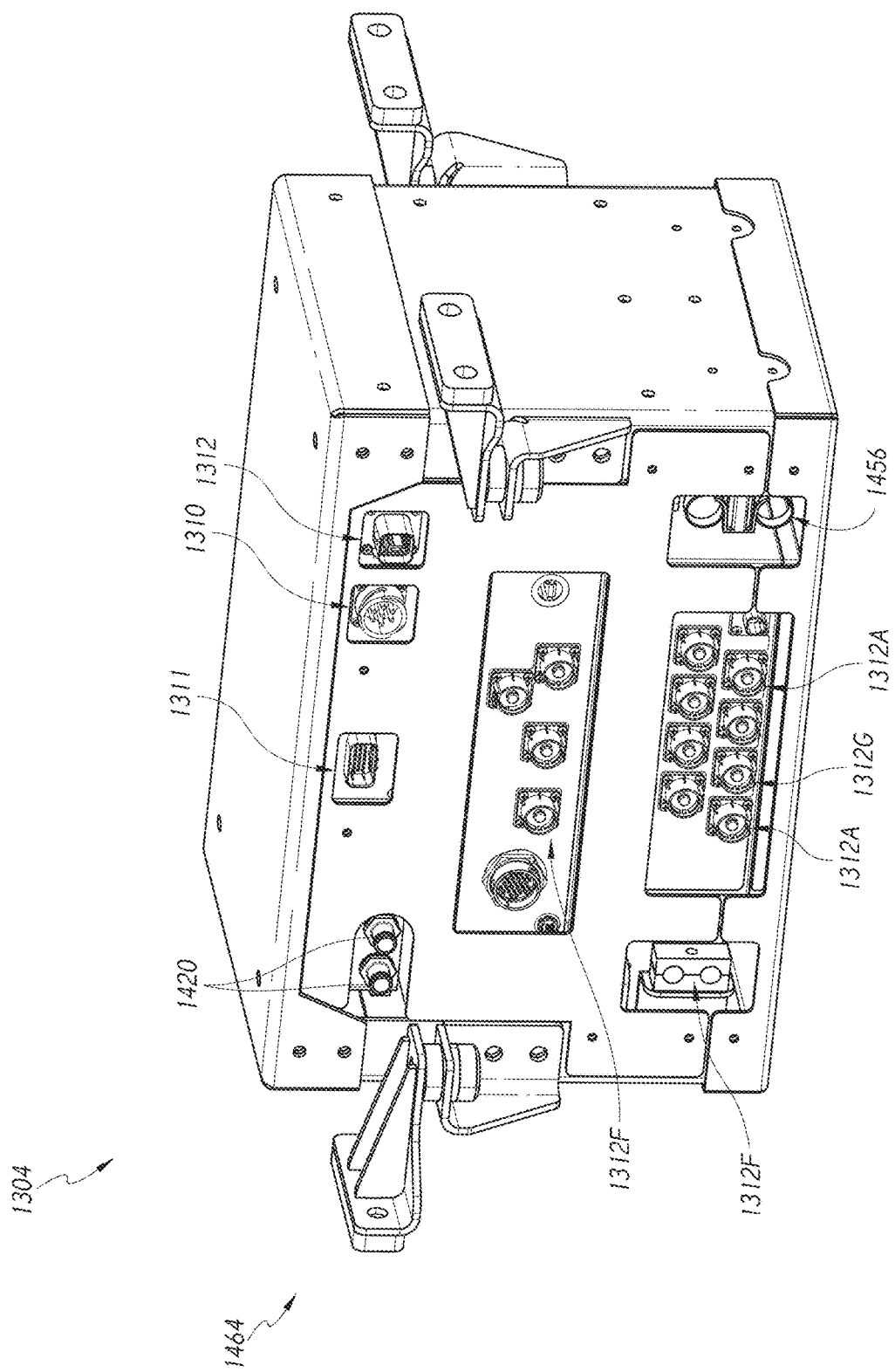
FIG. 16 is a front perspective view of a first electrical sub-assembly configured with shared components.
Figure 17:
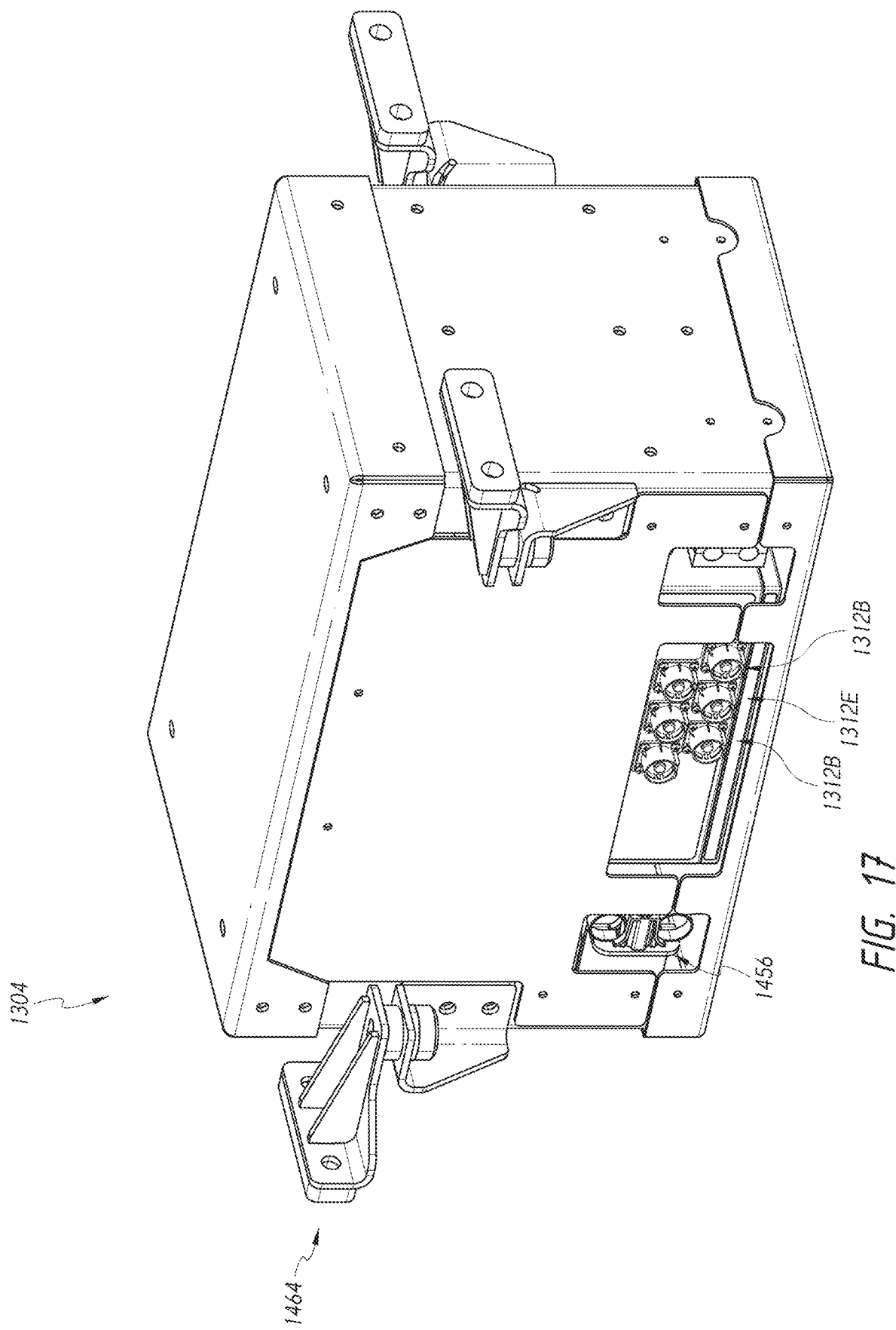
FIG. 17 is a rear perspective view of the first electrical sub-assembly of FIG. 16.

The routing of power through the electric vehicle system 1300 can include a plurality of high voltage cable junctions to facilitate connection to the first electrical sub-assembly 108A and the second electrical sub-assembly 108B. In one embodiment one or a plurality of junctions 1312A is provided on a forward facing side of the first housing 1304. The junctions 1312A are configured to be connected to conductors or conductor pairs, such as high voltage cables 1314A. The junctions 1312A can receive current from the battery assembly 100. Current can also flow through the junctions 1312A from the charge receptacle 124 to the battery assembly 100 when the system is charging under the control of the charging circuits in the first electrical sub-assembly 108A. The cables 1314A can have a first end coupled with the battery assembly 100 and a second end coupled with the junctions 1312A (shown in FIG. 14). The first electrical sub-assembly 108A can convey the current through circuits and may process the current to some extent, e.g., by flowing the current through fuses 1308. The first electrical sub-assembly 108A can convey the current to the battery assembly 100 through the AC and/or fast charging circuits disposed in the first housing 1304, which current can be received through the charging cables 132 coupled with junctions 1312F. In one embodiment the first electrical sub-assembly 108A includes a charge component that is separate from a power distribution component. FIG. 16 shows the charge component being disposed over the power distribution component, with both mounted in the first housing 1304. The charge component and the power distribution components can be integrated into a single unit or within a single housing or frame in some embodiments. The current from the charging cables 132 can be received in the charging component at the junctions 1312F. Current out of the charging component can be routed via a cables (not shown) extending between the charging component and the power distribution component and connected to the junctions 1312G. The power distribution component can be configured to direct current from the charging cables 132 connected to the junctions 1312F and through the connecting cable to the cables 1314A disposed between the first electrical sub-assembly 108A and the battery assembly 100.

Figure 14:
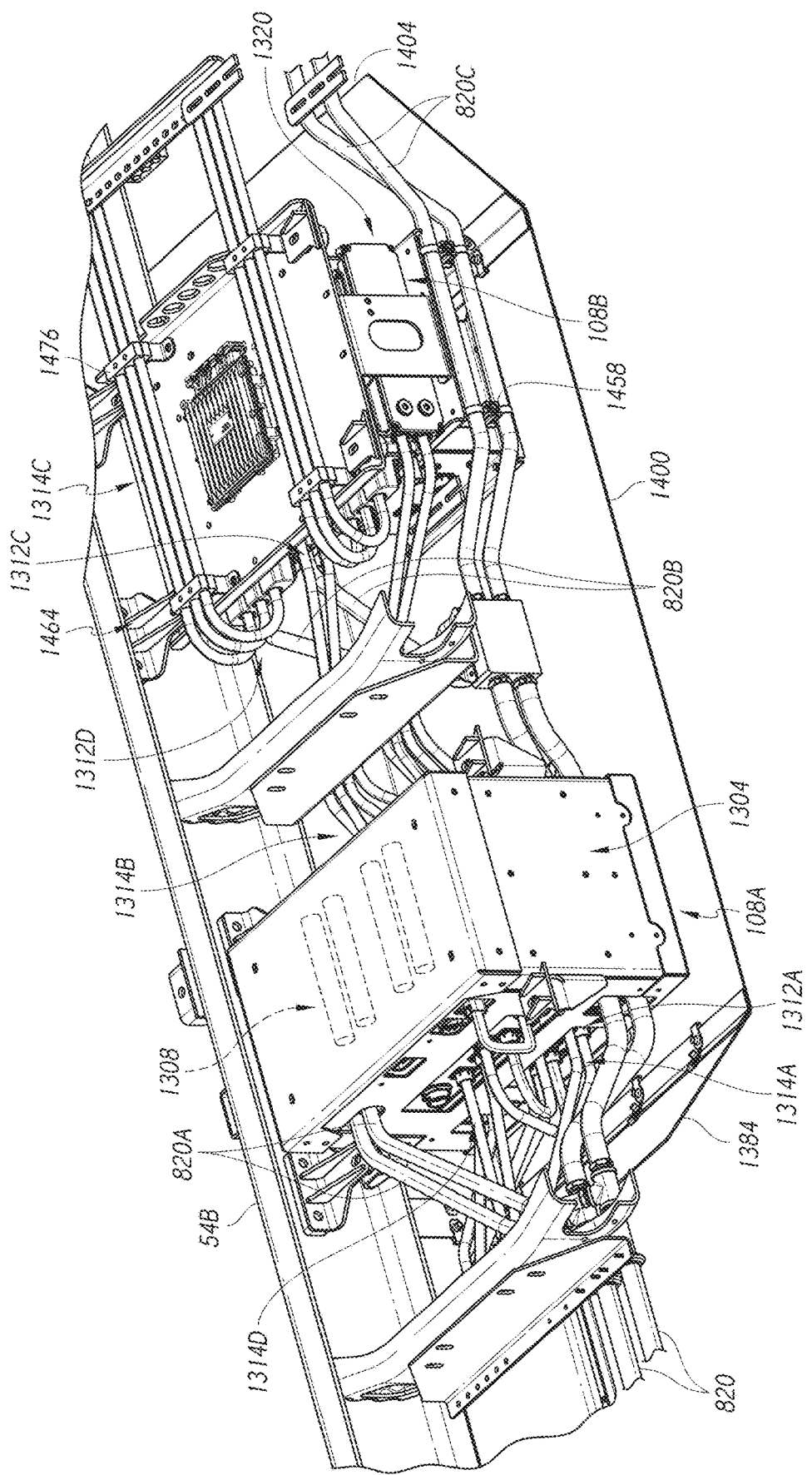
FIG. 14-15 are perspective and side cross-sectional views showing a debris deflector capable of providing protection for an electric vehicle system that would be otherwise exposed to ground debris in operation of a vehicle assembly.

The first housing 1304 can have a plurality of junctions 1312B disposed on a rearward side of the first housing 1304. The junctions 1312B can be connected to conductors such as high voltage cables 1314B that can be routed to and thereafter connected to junctions 1312C disposed on one or more power converters 1324 mounted to the second housing 1320. The power converters 1324 can include junctions 1312D configured to be connected to conductors to supply current to a load such as an axle drive assembly 112. FIG. 14 shows that conductors, such as high voltage cables 1314C, can extend from the junctions 1312D to the axle drive assembly 112 or another load located rearward of the second electrical sub-assembly 108B. The junctions 1312D can be routed over the top of the second housing 1320 which provides easier access and additional protection to the cables 1314C.

Power from the electric vehicle system 1300 processed through the first electrical sub-assembly 108A or the second electrical sub-assembly 108B (or the rear end electric component assembly 108 if combined) can be routed forwardly to the front end accessory component assembly 104. A plurality of junctions 1312E can be located on a rearward side of the first electrical sub-assembly 108A. One or more cables 1314D can be coupled with the junction 1312E and can extend from the junctions 1312E to the front end accessory component assembly 104. FIG. 13 shows that the cables 1314D extend from the rearward side of the first electrical sub-assembly 108A through an aperture 1306 in the first housing 1304 to be routed forwardly along the frame assembly 54 to the front end accessory component assembly 104. In this arrangement fuses and other circuits for conveying the current supplied by the battery assembly 100 can be disposed in a common electrical sub-assembly, e.g., together in one housing that can be mounted at a rearward portion of the a vehicle.

Routing of cables through the frame assembly 54 can be provided and protected by a number of assemblies. A high voltage cable support assembly 1340 can be provided to protect cables 1314A conveying current between the battery assembly 100 and the first electrical sub-assembly 108A both to and from the battery assembly 100. The high voltage cable support assembly 1340 can also protect the cables 1314D conveying current to the 1 front end accessory component assembly 104. The high voltage cable support assembly 1340 can also protect the charging cables 132 conveying current to the battery assembly 100 by way of the first electrical sub-assembly 108A (or the rear end electric component assembly 108 if a single housing is used).

Figure 12:
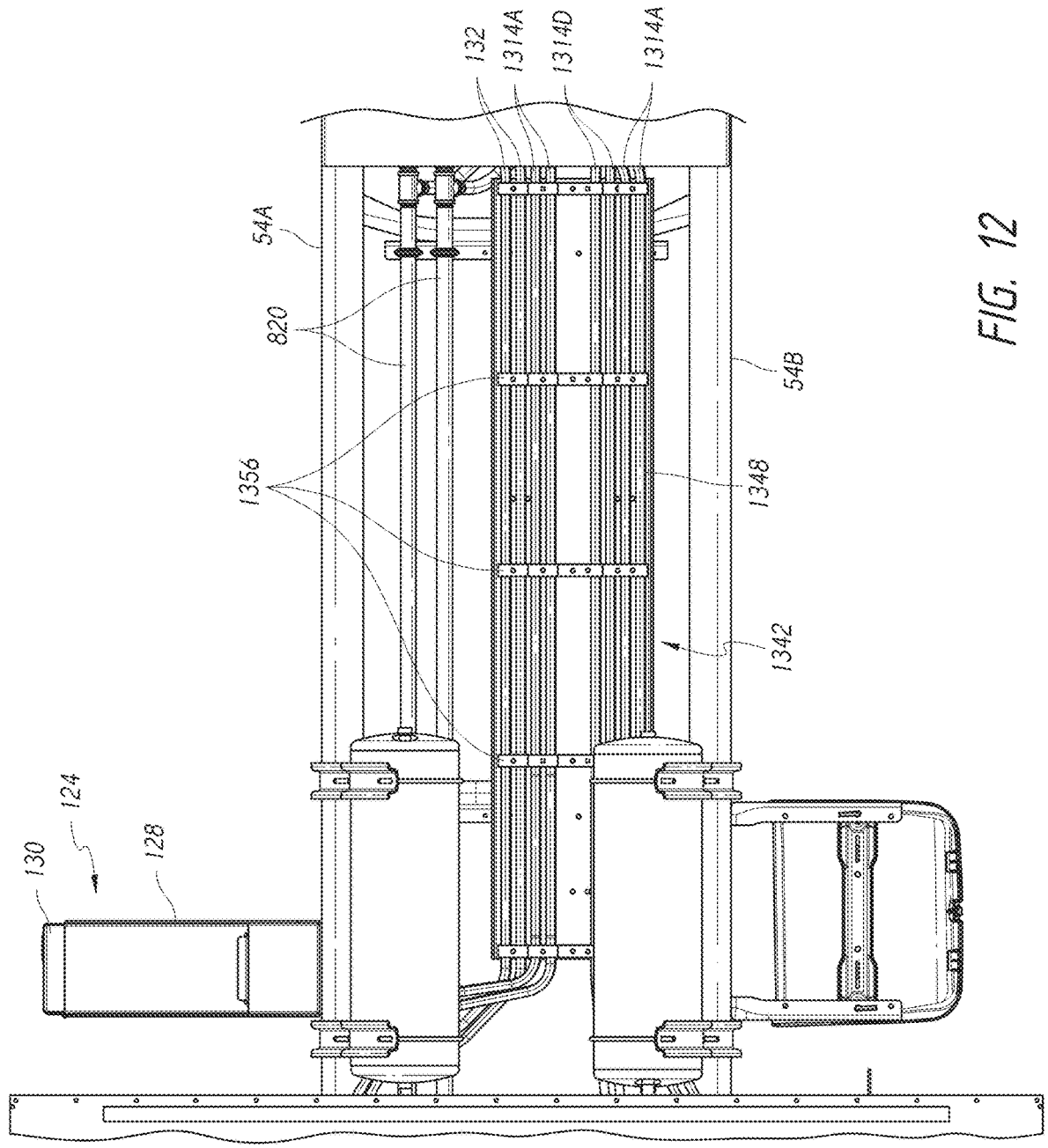
FIG. 12 is a bottom view of a protective housing for high voltage cables with a bottom cover removed showing the routing of cables through the housing.

The cables 1314A can be connected to the battery assembly 100 and can extend rearward therefrom through the high voltage cable support assembly 1340 to the first electrical sub-assembly 108A. FIG. 12 shows that a span of the cables 1314A, the cables 1314D, and/or the charging cables 132 can be supported in the high voltage cable support assembly 1340. The high voltage cable support assembly 1340 can have or can define a plurality of spaced apart channels that can each be configured to enclose one of the cables 1314A, 1314D, 132. The high voltage cable support assembly 1340 is configured to be disposed between the battery assembly 100 and the first electrical sub-assembly 108A. The high voltage cable support assembly 1340 can include a housing 1342 that encloses the cables 1314A, 1314D, 132 on both sides. The housing 1342 includes a lower shell 1344 and an upper shell 1348. A space between the lower shell 1344 and the upper shell 1348 can be segmented to house the cables 1314A, 1314D, 132. In one embodiment, one or a plurality of mounts 1356 can be secured to an inside surface of one or both of the lower shell 1344 and the upper shell 1348. The mounts 1356 can provide a pair of facing surfaces that partially surround a segment of one or more of the cables 1314A, 1314D, 132. The mounts 1356 can include a lower mount with a first semicircular surface and an upper mount with a second semicircular surface. The first and second semi-circular surfaces can extend around and engage small lengths of the cables 1314A, 1314D, 132 to hold the cables in place within the high voltage cable support assembly 1340. The first and second semi-circular surfaces can form parts of a clamp to retain the cables 1314A, 1314D, 132 against sliding within or longitudinal translation relative to the housing 1342.

The lower shell 1344 can include a lower surface that can deflect rocks and other debris from the road or ground as the vehicle assembly 50A is moving. Thus the high voltage cable support assembly 1340 provides for organized routing and protection for the cables 1314A, 1314D, 132. FIG. 12 shows that the cables 1314A, 1314D, 132 can extend into the housing 1342 from a forward end and can extend out of the housing at a rearward end. A length of the cables 1314A that extends from the battery assembly 100 can extend into the housing 1342 at the forward end of the housing 1342. A length of the cables 1314A that extends to the first electrical sub-assembly 108A (or to the rear end electric component assembly 108 if a single housing is provided) from the housing 1342 can extend from the rearward end of the housing 1342. A rearward length of the cables 1314D that is coupled with the first electrical sub-assembly 108A, e.g., to a rearward side of the first housing 1304, can extend to the housing 1342 and a forward length of the cables 1314D can extend from the forward end of the housing 1342 to the front end accessory component assembly 104. A forward length of the charging cables 132 that is coupled with the housing 128 of the charge receptacle 124 can extend to the housing 1342 and a rearward length of the charging cables 132 can extend from the housing 1342 to the first electrical sub-assembly 108A, e.g., to a forward side of the first housing 1304. In one modified embodiment, the rear end electric component assembly 108 is provided and rearward portions of the cables 1314A, 1314D, 132 are connected to junctions on the housing thereof.

The cables 1314D that convey current from to the front end accessory component assembly 104 can be secured by a plurality of mounts 1356, e.g., by the mounts 1356 and can extend through and can convey current forwardly through the housing 1342 toward the front end of the vehicle assembly 50A. The cables 1314D can extend through an upwardly oriented recess 1412 (See FIG. 1) of the battery assembly battery assembly 100. The upwardly oriented recess 1412 or concavity of the battery assembly 100 can be disposed between lateral portions of a housing of the battery assembly 100. The lateral portions of the battery assembly 100 can enclose battery units. At least a portion of a span of the cables 1314D can extend through a space enclosed on at least three sides with battery units disposed in one or more housings. At least a portion of a span of the cables 1314D can extend through a space enclosed on at least three sides with battery units disposed in one or more housings and a lower side of a vehicle assembly, e.g., a bottom portion of a cab assembly.

FIGS. 11-14 show that the cables 1314A, 1314D, 132 can traverse from the housing 1342 toward the first electrical sub-assembly 108A to corresponding cable junctions, e.g., to the junctions 1314A, 1314E, 1314F. This expanse of the cables 1314A, 1314D, 132 can be protected by a debris deflector 120. In one form, the debris deflector 120 includes a forward facing surface 1384. The forward facing surface 1384 is configured to be disposed forward of the junctions 1314A, 1314E, 1314F or other cable interface. The forward facing surface 1384 can be part of the debris deflector 120. The debris deflector 120 can have a concave configuration with an upwardly facing recess 1392. The recess 1392 can at least partially enclose the first electrical sub-assembly 108A and/or the second electrical sub-assembly 108B. The upwardly facing recess 1392 can be enclosed on one or both sides by side panels 1394. The debris deflector 120 can include a forward edge 1396 that is configured to be disposed forward of the junctions 1312A. The forward edge 1396 can be disposed along the top of the forward facing surface 1384. The forward facing surface 1384 can be connected to forward portions of one or both of the side panels 1394. The debris deflector 120 can include a lower surface 1400 configured to be disposed below the first electrical sub-assembly 108A and/or the second electrical sub-assembly 108B. The lower surface 1400 can be connected to bottom edges of the side panels 1394. The debris deflector 120 can extend to a rearward edge 1404 configured to be disposed rearward of a rearward facing side of the second electrical sub-assembly 108B. The rearward edge 1404 can extend along a top portion of a rearward facing surface that is connected at its lateral ends to rearward edges of the side panels 1394. In one embodiment, the forward facing surface 1384, the side panels 1394 and the rearward facing surface bounded by the side panels 1394 and the rearward edge 1404 can provide an enclosed volume of the upwardly facing recess 1392.

The debris deflector 120 can be coupled with the frame assembly 54 in any suitable manner. For example the debris deflector 120 can include a plurality of brackets 1408. The plurality of brackets 1408 are configured to support a deflection member, e.g., the concave lower shell of the debris deflector 120, from one or more frame rails of a vehicle chassis. The plurality of brackets 1408 can extend upwardly from an outside surface of the side panels 1394. The plurality of brackets 1408 can extend to a position along an outside surface of the first longitudinal frame member 54A and to an outside surface of the second longitudinal frame member 54B in use. The plurality of brackets 1408 allow the debris deflector 120 to be mounted to the vehicle assembly 50A either as originally assembled or as a retrofitted accessory.

Figure 15:
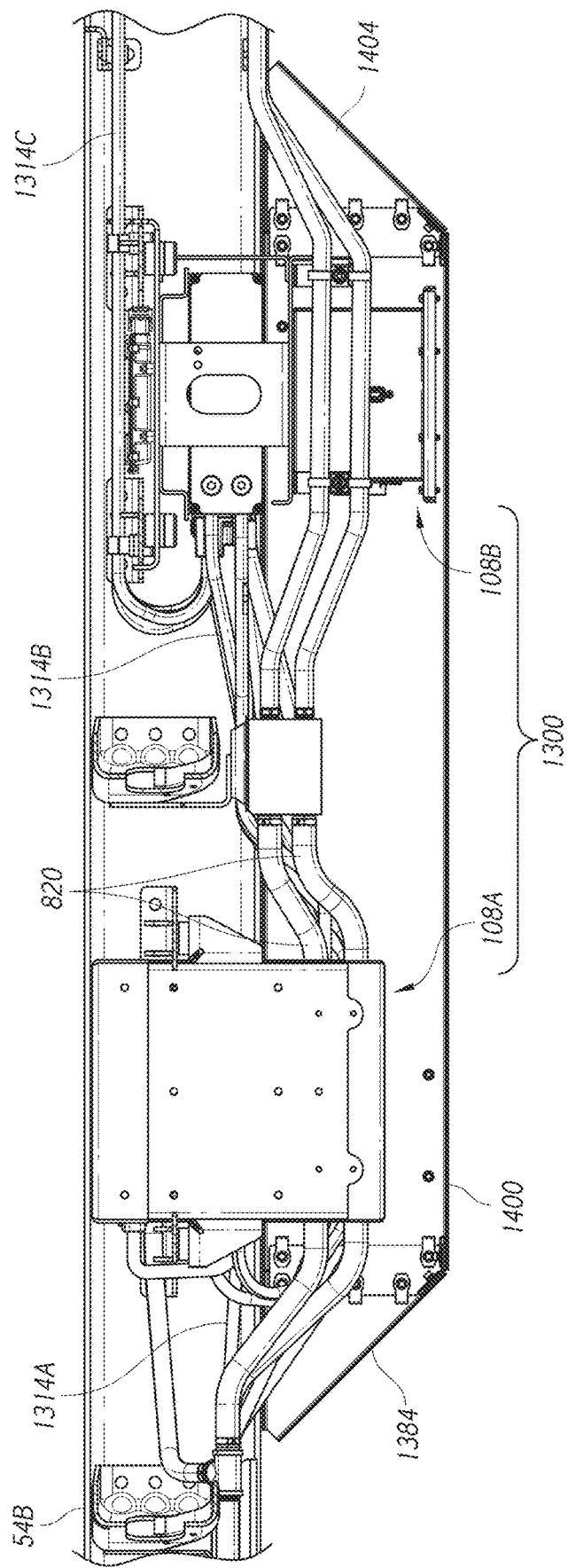

The upwardly facing recess 1392 can be configured with a depth that allows a variety of components to be disposed in the recess. FIG. 15 shows that the second electrical sub-assembly 108B can extend to a position adjacent to the inside of the lower surface 1400 providing small or no clearance therebetween. In some cases, the second electrical sub-assembly 108B can be a shallower assembly where a larger clearance may be provided between a lower side of the second electrical sub-assembly 108B and the inside of the lower surface 1400. Thus, the debris deflector 120 can be modular in allowing a variety of electrical sub-assemblies to fie within the upwardly facing recess 1392. In another approach, the second electrical sub-assembly 108B has a second housing 1320 that is configured to fit components of different dimensions such that the height of the second electrical sub-assembly 108B and the clearance in the debris deflector 120 is the same for various vehicle configurations but the clearances within the second housing 1320, e.g., between the components and upper and lower plate thereof can vary from one vehicle configuration to another.

The vehicle assembly 50A includes provision for routing coolant to rearward components. The vehicle assembly 50A includes a second coolant loop 820 that routes rearwardly from the front end accessory component assembly 104. The second coolant loop 820 can have a coolant loop branch 820A that can split a portion of the coolant to the first electrical sub-assembly 108A. The coolant loop branch 820A can be secured to the second coolant loop 820 at a T-junction whereby a portion of the flow in the second coolant loop 820 is diverted through the first electrical sub-assembly 108A. The coolant loop branch 820A can connect to a coolant junction 1420 disposed on the first housing 1304. The cool side of the coolant loop branch 820A can flow into the first electrical sub-assembly 108A to cool the components thereof. The warm side of the coolant loop branch 820A can flow back to the warm side of the second coolant loop 820. The second coolant loop 820 can also include a coolant loop branch 820B. The coolant loop branch 820B is configured to split a portion of the coolant in the second coolant loop 820 to flow into the second electrical sub-assembly 108B. The coolant loop branch 820B can be secured to the second coolant loop 820 at a T-junction. The T-junction can cause a fraction of the coolant in the second coolant loop 820 to flow to the second electrical sub-assembly 108B. The coolant loop branch 820B can flow cool side coolant to a coolant junction 1424 disposed on the second housing 1320. After flowing through the second electrical sub-assembly 108B, e.g., through the power converters 1324, the warm coolant can be merged into the warm side of the second coolant loop 820.

The coolant in the second coolant loop 820 that does not flow to the first electrical sub-assembly 108A or the second electrical sub-assembly 108B continues on in a coolant loop branch 820C that flows to a further rearward components needing cooling, for example, the axle drive assembly 112.

Figure 18:
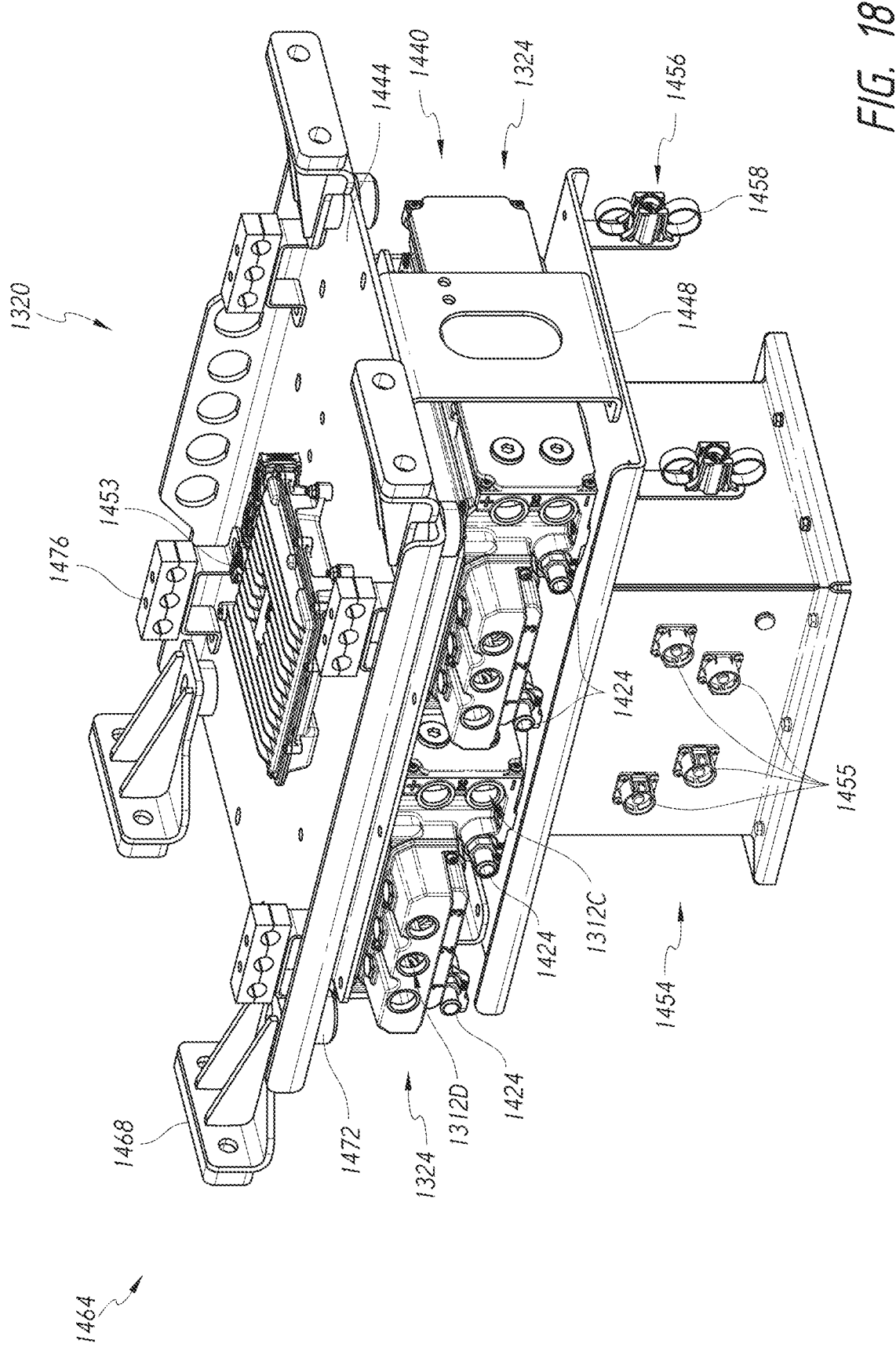
FIG. 18 is a front perspective view of a second electrical sub-assembly configured with vehicle specific components.
Figure 19:
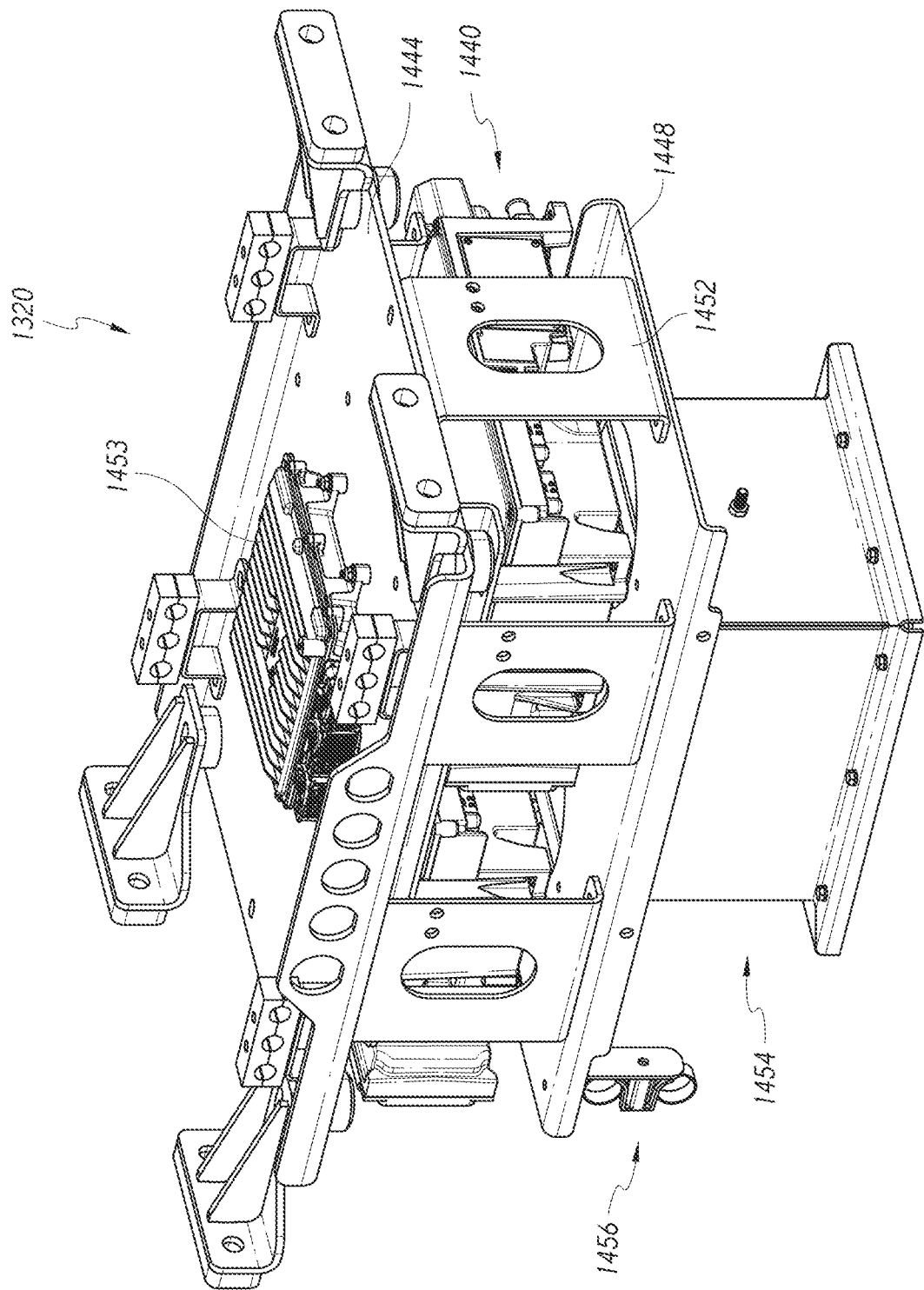
FIG. 19 is a rear perspective view of the second electrical sub-assembly of FIG. 18.
Figure 20:
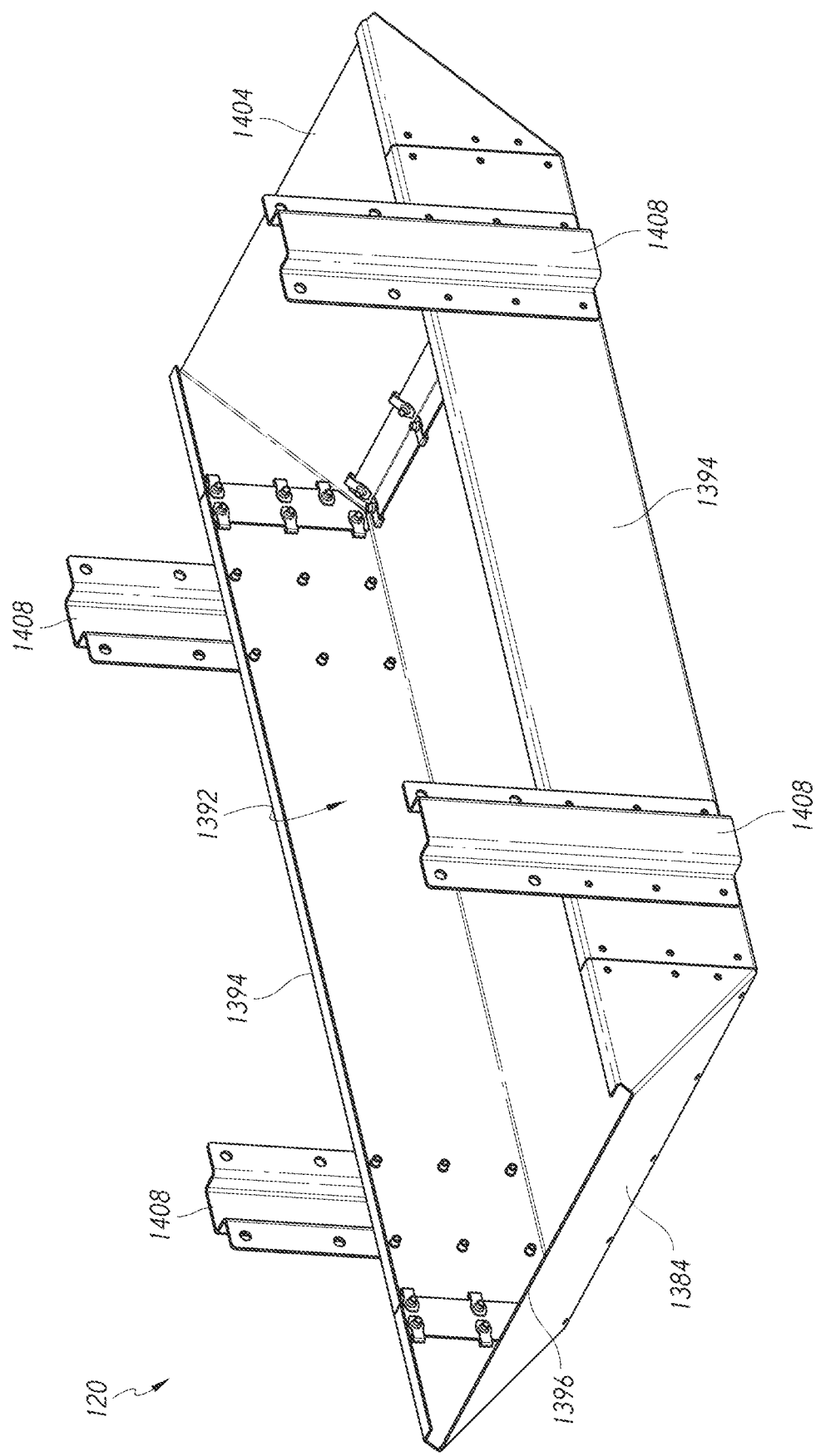
FIG. 20 shows one embodiment of a debris deflector.

As discussed above, the second electrical sub-assembly 108B provide modularity in enabling components with different form factors or other vehicle specific features to be flexibly provided in a vehicle assembly. The second housing 1320 of the second electrical sub-assembly 108B is configured to provide a flexible components mounting in a component mounting space 1440. The component mounting space 1440 can be defined between an upper plate 1444 and a lower plate 1448. The vertical size of the component mounting space 1440 can be defined by one or a plurality of supports columns 1452. The supports columns 1452 can be configured as plate members that extend along a portion of one or more sides of the second housing 1320. In one embodiment, the supports columns 1452 span between the upper plate 1444 and the lower plate 1448 on three of the four sides of the second housing 1320 to leave one side (in the illustrated embodiment the forward side) open to allow for positioning the power converters 1324 in the component mounting space 1440. The housing power converters 1324 can be mounted to a top side of the upper plate 1444, to a lower side of the lower plate 1448 or to one or both of the upper plate 1444 and the lower plate 1448. To increase the rigidity of the second housing 1320 one or both of the upper plate 1444 and the lower plate 1448 can have a folded end portion. For example, the upper plate 1444 and/or the lower plate 1448 can be made of sheet metal with a ninety degree bend at one or both ends. Bends can be provided at both ends and when so provided can extend in opposite directions, as seen in FIG. 18.

A lower portion of the second electrical sub-assembly 108B can include a contactor component 1454. The contactor component 1454 provides an ability to break the circuit between the first electrical sub-assembly 108A and the second electrical sub-assembly 108B. In particular, one of the cables 1314B of each pair of cables 1314B can be coupled directly to the power converters 1324 and the other cable of the pair of cables 1314B can be coupled to one of the junctions 1455. A separate cable can span from the junctions 1455 to the power converters 1324. Thus the contactor component 1454 can be placed in the current flow path from the first electrical sub-assembly 108A to the power converters 1324 to enable the flow of current to the power converters 1324 to be broken as needed, either by disconnecting the connection between the junctions 1455 and the power converters 1324 or by operation of a circuit within the contactor component 1454.

An upper portion of the second electrical sub-assembly 108B can be provided for mounting a drive control module 1453. The drive control module 1453 can be configured to control the operation of the axle drive assembly 112 in various embodiments. Thus the second electrical sub-assembly 108B can be provided to organize both for converting the power delivered by the battery assembly 100 to the axle drive assembly 112 and for controlling the operation of the axle drive assembly 112, including the application of torque to wheels of the vehicle assembly.

The second housing 1320 can also provide for supporting a span of the second coolant loop 820. In one embodiment a plurality of coolant supports 1456 can be provided. In the illustrated embodiment a forward plurality of coolant supports 1456 can be provided toward a forward side of the second housing 1320 and a rearward plurality of coolant supports 1456 can be provided toward a rearward side of the second housing 1320. An upper one of the forward plurality and an upper one of the rearward plurality of coolant supports 1456 can support a first leg (e.g., the hot or cool side) of the coolant loop branch 820C. A lower one of the forward plurality and a lower one of the rearward plurality of coolant supports 1456 can support a second leg (e.g., the cool or hot side) of the coolant loop branch 820C. The coolant supports 1456 can comprise ring clamps 1458, e.g., hose clamps, supported from above by flanges. The second housing 1320 thus can support a portion of the coolant system of the electric vehicle system 1300 on an external area thereof. In contrast, the first housing 1304 of the first electrical sub-assembly 108A can include a through-hole or passage within which coolant supports 1456 can be disposed. The coolant supports 1456 of the first electrical sub-assembly 108A can be surrounded by walls of the first housing 1304 to retain and to protect the coolant loop 820 following the T-branch that separates coolant to flow to the first electrical sub-assembly 108A to dissipate heat of components therein.

The second electrical sub-assembly 108B has additional features that can also be seen in the first electrical sub-assembly 108A and thus will be described chiefly in connection with the second electrical sub-assembly 108B. Such description applies to the first electrical sub-assembly 108A and to other components with similar features. The upper plate 1444 has a plurality of mounts 1476 disposed on a top surface thereof to mount cables 1314C thereto. FIG. 18 shows that a forward mounts 1476 and a rearward mounts 1476 on one side of the second housing 1320 is provided to allow for two points of securement of a plurality of, e.g., three, cables 1314C to the top side of the second housing 1320. A forward mounts 1476 and a rearward mounts 1476 on an opposite side of the second housing 1320 is provided to allow for two points of securement of a plurality of, e.g., three, cables 1314C to the top side of the second housing 1320. Thus, the mounts 1476 control the position of and limit unwanted movement of the cables 1314C.

The first electrical sub-assembly 108A and the second electrical sub-assembly 108B can be secured to the frame assembly 54 by a suitable approach. For example, FIG. 18 shows that a plurality of, e.g., four, mounting assemblies 1464 can be provided for mounting the second housing 1320 to inside surfaces of the first longitudinal frame member 54A and the second longitudinal frame member 54B. The mounting assemblies 1464 can each include a flange 1468 and a vibration isolator 1472. The vibration isolator 1472 can be disposed on both sides of the upper plate 1444. The flange 1468 can be secured to a top portion of the vibration isolator 1472 above the upper plate 1444. The flange 1468 can be a right angle flange, e.g., with an outer portion thereof bent 90 degrees relative to a portion of the flange 1468 coupled to the vibration isolator 1472. The flange 1468 also can have one or a plurality of, e.g., two, ribs disposed on a top and/or bottom side thereof. The second electrical sub-assembly 108B can include forward and backward mounting assemblies 1464 on each side to provide two points of mounting on each side of the frame assembly 54. FIGS. 14-17 show that the first electrical sub-assembly 108A can be mounted in a very similar fashion to the second electrical sub-assembly 108B. That is the mounting assemblies 1464 can be coupled directly or indirectly to the first housing 1304. The mounting assemblies 1464 can then secure the first electrical sub-assembly 108A to inside surfaces of the first longitudinal frame member 54A and the second longitudinal frame member 54B.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. An accessory component system, comprising:
   a first electrical sub-assembly configured to support a first plurality of vehicle accessories and coupled to frame rails of a vehicle at a first location behind a cab of a vehicle, the first plurality of vehicle accessories including a power distribution unit and a charge circuit located in a single housing and electrically coupled together;

a second electrical sub-assembly configured to support a second plurality of vehicle accessories and being coupled to the frame rails of the vehicle at a second location behind the cab of the vehicle; and a debris deflector coupled to the frame rails and configured to protect the first electrical sub-assembly and the second electrical sub-assembly from ground debris, wherein the first electrical sub-assembly and the second electrical sub-assembly and their respective vehicle accessories supported thereby are coupled to the frame rails of the vehicle such that the vehicle accessories can be functionally coupled to other vehicle components, and when so coupled the first electrical sub-assembly and the second electrical sub-assembly are not rotatable relative to a chassis of the vehicle.

2. The accessory component system of claim 1, wherein the second electrical sub-assembly has a first area at least partially defined by a first plate and a second area at least partially defined by a second plate.

3. The accessory component system of claim 2, wherein a first electrical component of the second electrical sub-assembly is located in the first area and coupled to the first plate.

4. The accessory component system of claim 3, wherein a second electrical component of the second electrical sub-assembly is located in the second area and coupled to at least one of the first plate and/or the second plate.

5. The accessory component system of claim 4, wherein a third electrical component of the second electrical sub-assembly is located in a third area and coupled to the second plate.

6. The accessory component system of claim 2, wherein the second electrical sub-assembly includes at least one of a contactor configured to break an electrical connection between the first electrical sub-assembly and the second electrical sub-assembly, a power converter configured to convert power inbound to the second electrical sub-assembly to load-specific power to an electrical load of the vehicle, or a drive control module configured to control operations of an axle drive assembly of the vehicle.

7. The accessory component system of claim 6, wherein the power converter includes one or more junctions facing a forward direction,
wherein the electrical load is located in a rearward direction relative to the second electrical sub-assembly, and
wherein cables connecting the one or more junctions to the electrical load are routed over a top of the second electrical sub-assembly through cable mounts to provide easier access and protection to the cables.

8. The accessory component system of claim 1, wherein the first electrical sub-assembly and the second electrical sub-assembly each include mounting assemblies configured to couple the first electrical sub-assembly and the second electrical sub-assembly to inside surfaces of the frame rails.

9. An accessory component system comprising,
a first electrical sub-assembly configured to support a first plurality of vehicle accessories and coupled to frame rails of a vehicle at a first location behind a cab of a vehicle;
a second electrical sub-assembly configured to support a second plurality of vehicle accessories and being coupled to the frame rails of the vehicle at a second location behind the cab of the vehicle; and
a debris deflector coupled to the frame rails and configured to protect the first electrical sub-assembly and the second electrical sub-assembly from ground debris, wherein the first electrical sub-assembly and the second electrical sub-assembly and their respective vehicle accessories supported thereby are coupled to the frame rails of the vehicle such that the vehicle accessories can be functionally coupled to other vehicle components, and when so coupled the first electrical sub-assembly and the second electrical sub-assembly are not rotatable relative to a chassis of the vehicle, wherein the first electrical sub-assembly includes a housing and one or more junctions located on a forward-facing side of the housing, the one or more junctions being configured to facilitate flow of electrical current with a battery assembly of the vehicle.

10. The accessory component system of claim 9, wherein the second electrical sub-assembly has a first area at least partially defined by a first plate and a second area at least partially defined by a second plate.

11. The accessory component system of claim 10, wherein a first electrical component of the second electrical sub-assembly is located in the first area and coupled to the first plate.

12. The accessory component system of claim 11, wherein a second electrical component of the second electrical sub-assembly is located in the second area and coupled to at least one of the first plate and/or the second plate.

13. The accessory component system of claim 12, wherein a third electrical component of the second electrical sub-assembly is located in a third area and coupled to the second plate.

14. The accessory component system of claim 9, wherein the second electrical sub-assembly includes at least one of a contactor configured to break an electrical connection between the first electrical sub-assembly and the second electrical sub-assembly, a power converter configured to convert power inbound to the second electrical sub-assembly to load-specific power to an electrical load of the vehicle, or a drive control module configured to control operations of an axle drive assembly of the vehicle.

15. The accessory component system of claim 14, wherein the power converter includes one or more junctions facing a forward direction,
wherein the electrical load is located in a rearward direction relative to the second electrical sub-assembly, and
wherein cables connecting the one or more junctions to the electrical load are routed over a top of the second electrical sub-assembly through cable mounts to provide easier access and protection to the cables.

16. An accessory component system comprising,
a first electrical sub-assembly configured to support a first plurality of vehicle accessories and coupled to frame rails of a vehicle at a first location behind a cab of a vehicle;
a second electrical sub-assembly configured to support a second plurality of vehicle accessories and being coupled to the frame rails of the vehicle at a second location behind the cab of the vehicle; and
a debris deflector coupled to the frame rails and configured to protect the first electrical sub-assembly and the second electrical sub-assembly from ground debris, the debris deflector including a forward-facing surface with a forward edge disposed along a top of the forward-facing surface, a rearward-facing surface with a rearward edge disposed along a top of the rearward-facing surface, and side panels, the forward-facing surface, the rearward-facing surface, and the side panels defining an upwardly-facing recess configured to at least partially enclose the first electrical sub-assembly and the second electrical sub-assembly, wherein the first electrical sub-assembly and the second electrical sub-assembly and their respective vehicle accessories supported thereby are coupled to the frame rails of the vehicle such that the vehicle accessories can be functionally coupled to other vehicle components, and when so coupled the first electrical sub-assembly and the second electrical sub-assembly are not rotatable relative to a chassis of the vehicle.

17. The accessory component system of claim 16, wherein the forward edge is disposed forward of one or more junctions of the first electrical sub-assembly to protect cables from debris, and wherein the rearward edge is disposed rearward of a rearward facing side of the second electrical sub-assembly.

18. The accessory component system of claim 16, further comprising a plurality of brackets extending upwardly from an outside surface of the side panels and extending to a position along an outside surface of the frame rails.

19. The accessory component system of claim 16, wherein the second electrical sub-assembly has a first area at least partially defined by a first plate and a second area at least partially defined by a second plate.

20. The accessory component system of claim 19, wherein a first electrical component of the second electrical sub-assembly is located in the first area and coupled to the first plate.

21. The accessory component system of claim 20, wherein a second electrical component of the second electrical sub-assembly is located in the second area and coupled to at least one of the first plate and/or the second plate.

22. The accessory component system of claim 21, wherein a third electrical component of the second electrical sub-assembly is located in a third area and coupled to the second plate.

23. The accessory component system of claim 16, wherein the second electrical sub-assembly includes at least one of a contactor configured to break an electrical connection between the first electrical sub-assembly and the second electrical sub-assembly, a power converter configured to convert power inbound to the second electrical sub-assembly to load-specific power to an electrical load of the vehicle, or a drive control module configured to control operations of an axle drive assembly of the vehicle.

24. The accessory component system of claim 23, wherein the power converter includes one or more junctions facing a forward direction, wherein the electrical load is located in a rearward direction relative to the second electrical sub-assembly, and wherein cables connecting the one or more junctions to the electrical load are routed over a top of the second electrical sub-assembly through cable mounts to provide easier access and protection to the cables.

* * * * *